(12) United States Patent
Askar

(10) Patent No.: US 6,823,405 B1
(45) Date of Patent: Nov. 23, 2004

(54) METHOD AND APPARATUS FOR INITIATING PARTIAL TRANSACTIONS IN A PERIPHERAL INTERFACE CIRCUIT FOR AN I/O NODE OF A COMPUTER SYSTEM

(75) Inventor: Tahsin Askar, Round Rock, TX (US)

(73) Assignee: Advanced Mirco Devices, Inc., Sunnyvale, CA (US)

( * ) Notice: Subject to any disclaimer, the term of this patent is extended or adjusted under 35 U.S.C. 154(b) by 299 days.

(21) Appl. No.: 10/093,349

(22) Filed: Mar. 7, 2002

Related U.S. Application Data

(63) Continuation-in-part of application No. 09/978,534, filed on Oct. 15, 2001, now abandoned.

(51) Int. Cl.[7] ................................................ G06F 3/00
(52) U.S. Cl. .............................. 710/52; 710/30; 710/31; 710/39
(58) Field of Search .......................... 710/1, 5, 17, 30, 710/31, 33, 39, 52, 54, 56, 57, 260; 712/215; 709/240; 711/100

(56) References Cited

U.S. PATENT DOCUMENTS

| | | | |
|---|---|---|---|
| 5,023,612 A | * | 6/1991 | Liu .............................. 341/94 |
| 5,931,934 A | * | 8/1999 | Li et al. ...................... 710/260 |
| 6,173,333 B1 | * | 1/2001 | Jolitz et al. .................. 709/240 |
| 6,246,684 B1 | * | 6/2001 | Chapman et al. ............ 370/394 |
| 6,278,532 B1 | | 8/2001 | Heimendinger et al. |
| 6,414,525 B2 | | 7/2002 | Urakawa |
| 6,414,961 B1 | | 7/2002 | Katayanagi |
| 6,502,236 B1 | * | 12/2002 | Allen et al. .................. 717/136 |
| 6,553,430 B1 | * | 4/2003 | Keller ........................... 710/5 |
| 6,681,274 B2 | * | 1/2004 | Ennis ........................... 710/52 |

OTHER PUBLICATIONS

U.S. patent application Ser. No. 09/399,281, filed Sep. 17, 1999.

* cited by examiner

*Primary Examiner*—Jeffrey Gaffin
*Assistant Examiner*—Alan S Chen
(74) *Attorney, Agent, or Firm*—Meyertons Hood Kivlin Kowert & Goetzel, P.C.; B. Noël Kivlin

(57) ABSTRACT

An apparatus for initiating partial transactions in a peripheral interface circuit for an I/O node of a computer system. An apparatus for performing partial transfers on a peripheral bus in response to a request for a stream of data includes a data buffer coupled to a control unit. The data buffer may be configured to store one or more data packets each containing data forming a portion of the data stream. The control unit may be configured to determine the presence of data packets stored in the data buffer that collectively contain a sequence of data forming a portion of the data stream. The control unit may be further configured to cause the sequence of data to be conveyed on the peripheral bus.

10 Claims, 13 Drawing Sheets

METHOD AND APPARATUS FOR INITIATING PARTIAL TRANSACTIONS IN A PERIPHERAL INTERFACE CIRCUIT FOR AN I/O NODE OF A COMPUTER SYSTEM

This is a continuation-in-part of application Ser. No. 09/978,534 filed on Oct. 15, 2001 abn.

BACKGROUND OF THE INVENTION

1. Field of the Invention

This invention relates to computer system input/output and, more particularly, to partial peripheral transaction handling within an input/output node.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by I/O devices is a peripheral component interconnect (PCI) bus.

Many I/O bridging devices use a buffering mechanism to buffer a number of pending transactions from the PCI bus to a final destination bus. However buffering may introduce stalls on the PCI bus. Stalls may be caused when a series of transactions are buffered in a queue and awaiting transmission to a destination bus and a stall occurs on the destination bus, which stops forward progress. Then a transaction that will allow those waiting transactions to complete arrives at the queue and is stored behind the other transactions. To break the stall, the transactions in the queue must somehow be reordered to allow the newly arrived transaction to be transmitted ahead of the pending transactions. Thus, to prevent scenarios such as this, the PCI bus specification prescribes a set of reordering rules that govern the handling and ordering of PCI bus transactions.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI bus and a graphics bus such as AGP. The PCI bus may be connected to a packet bus interface that may then translate PCI bus transactions into packet transactions for transmission on a packet bus. Likewise the graphics bus may be connected to an AGP interface that may translate AGP transactions into packet transactions. Each interface may communicate with a host bridge associated with one of the processors or in some cases to another peripheral device.

When PCI devices initiate the transactions, the packet-based transactions may be constrained by the same ordering rules as set forth in the PCI Local Bus specification. The same may be true for packet transactions destined for the PCI bus. These ordering rules are still observed in the packet-based transactions since transaction stalls that may occur at a packet bus interface may cause a deadlock at that packet bus interface. This deadlock may cause further stalls back into the packet bus fabric. Thus, to facilitate transaction ordering rules, an apparatus that may perform partial transfers on a peripheral bus may be desirable.

SUMMARY OF THE INVENTION

Various embodiments of an apparatus for initiating partial transactions in a peripheral interface circuit for an I/O node of a computer system are disclosed. In one embodiment, an apparatus for performing partial transfers on a peripheral bus in response to a request for a stream of data includes a data buffer coupled to a control unit. The data buffer may be configured to store one or more data packets each containing data forming a portion of the data stream. The control unit may be configured to determine the presence of data packets stored in the data buffer that collectively contain a sequence of data forming a portion of the data stream. The control unit may be further configured to cause the sequence of data to be conveyed on the peripheral bus.

In one implementation, the apparatus further includes a bus interface circuit that may be configured to cause one or more bus cycles to be initiated and thereby convey said sequence of data upon the peripheral bus. Each of the cycles may include an address corresponding to each data packet contained in the sequence of data. In another specific implementation, the control unit may be further configured to cause information corresponding to a bus cycle associated with the request for a stream of data to be provided to the bus interface circuit.

In yet another implementation, the apparatus may further include a command buffer coupled to the data buffer. The command buffer may be configured to store the commands belonging to a response virtual channel depending on whether each of the commands is a start command of the portion of the data stream.

Figure 1:
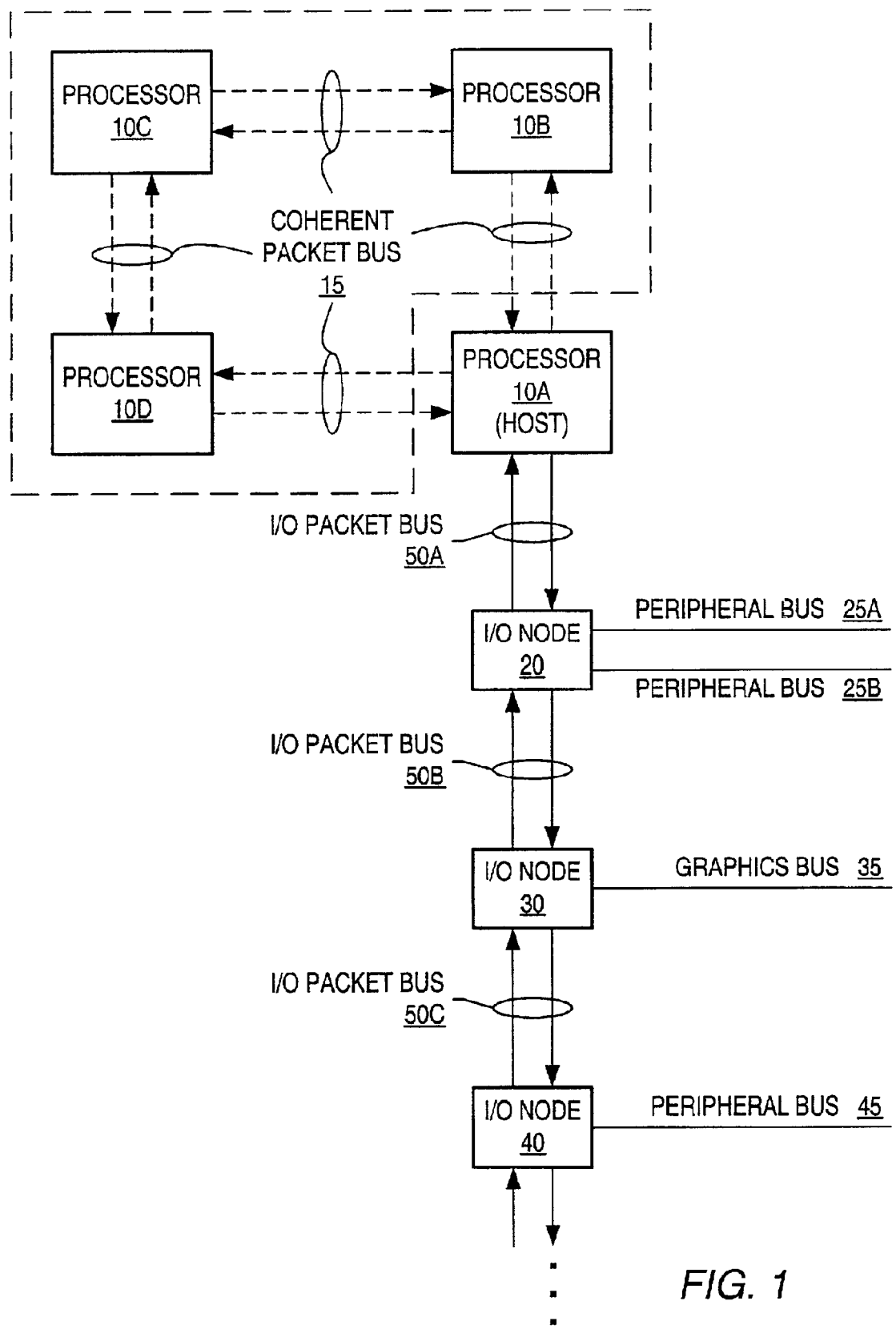
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Turning now to FIG. 1, a block diagram of one embodiment of a computer system is shown. The computer system includes processors 10A–10D each interconnected by a coherent packet bus 15. Each section of coherent packet bus 15 may form a point-to-point link between each of processors 10A–D. While four processors are shown using point-to point links it is noted that other numbers of processors may be used and other types of buses may interconnect them. The computer system also includes three I/O nodes numbered 20, 30 and 40 each connected together in a chain by I/O packet buses 50B and 50C respectively. I/O packet bus 50A is coupled between host node/processor 10A and I/O node 20. Processor 10A is illustrated as a host node which may include a host bridge for communicating with I/O packet bus 50A. Processors 10B–D may also include host bridges for communication with other I/O packet buses (not shown). The communication links formed by I/O packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45.

Processors 10A–10D are each illustrative of, for example, an x86 microprocessor such as an Athlon™ microprocessor. In addition, one example of a packet bus such as I/O packet bus 50A–50C may be a non-coherent HyperTransport™. Peripheral buses 25A–B and peripheral bus 45 are illustrative of a common peripheral bus such as a peripheral component interconnect (PCI) bus or an extended PCI (PCI-X) bus. Graphics bus 35 is illustrative of an accelerated graphics port (AGP), for example. It is understood, however, that other types of microprocessors and other types of peripheral buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. As used herein, "upstream" refers to packet traffic flow in the direction of the host bridge of processor 10A and "downstream" refers to packet traffic flow in the direction away from the host bridge of processor 10A. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. Since I/O node 20 may not forward packets to a peripheral device on peripheral bus 25 from downstream, the packets are transmitted upstream to the host bridge of processor 10A. The host bridge of processor 10A may then transmit the packets back downstream with a Unit ID of the host bridge of processor 10A until I/O node 20 recognizes and claims the packet for the peripheral device on peripheral bus 25. I/O node 20 may then translate the packets into peripheral bus transactions and transmit the transactions to the peripheral device on peripheral bus 25.

As the packet transactions travel upstream or downstream, the packets may pass through one or more I/O nodes. The pass-through is sometimes referred to as a tunnel and the I/O node is sometimes referred to as a tunnel device.

Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node, the I/O node may provide transaction reordering as well as packet buffering. The I/O node may also include control logic which controls the flow of packets to the tunnel from a peripheral device and from the tunnel to a peripheral device.

Figure 2:
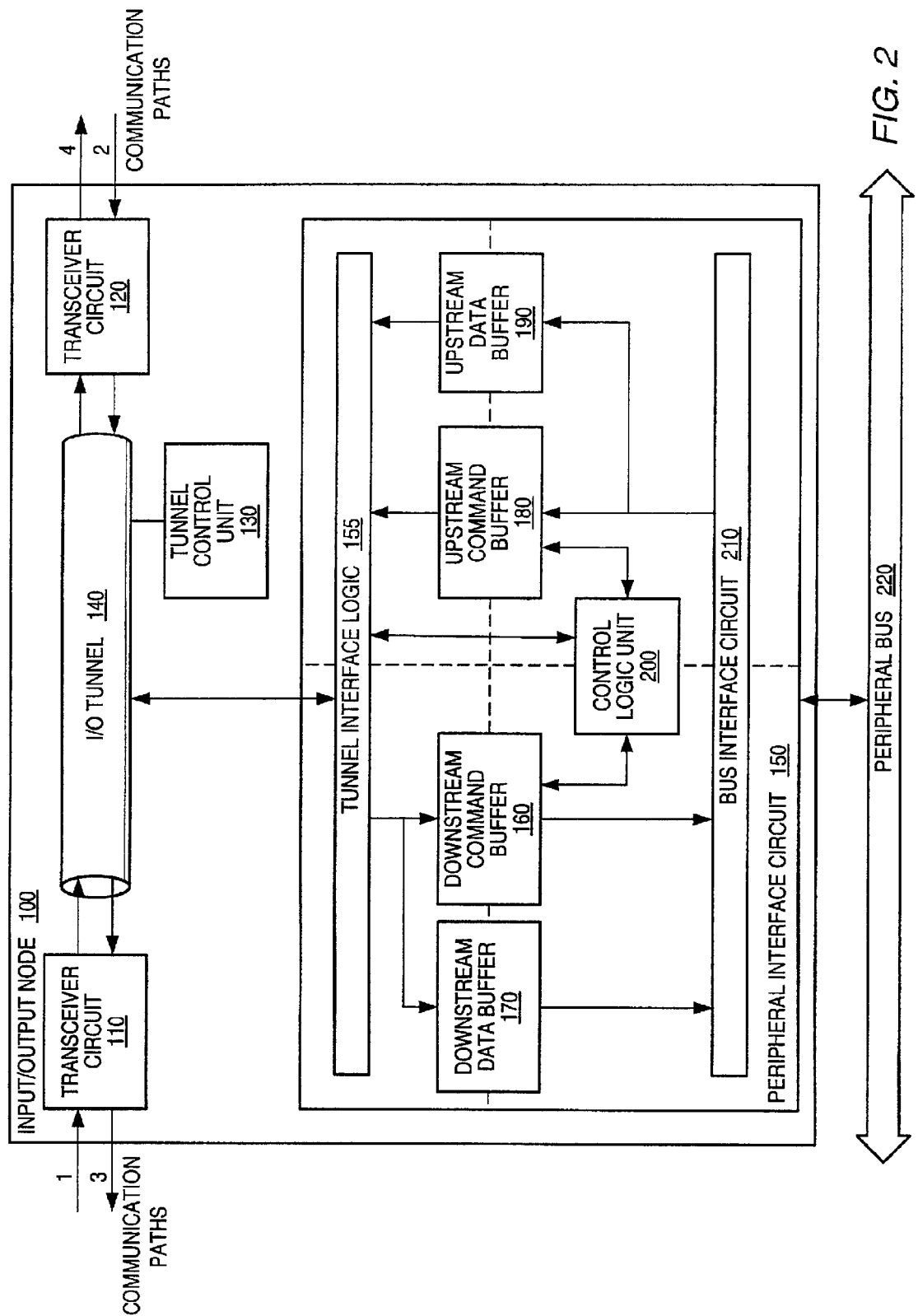
FIG. 2 is a block diagram of one embodiment of an input/output node.

Referring to FIG. 2, a block diagram of one embodiment of an input/output node is shown. Input/output node 100 includes a transceiver circuit 110 and a transceiver circuit 120. Transceiver circuits 10 and 120 are coupled together through an I/O tunnel 140. Transceiver circuits 110 and 120 may each include a transmitter and a receiver (not shown). The transmitters and receivers may be connected through I/O tunnel 140 such that the receiver of transceiver 110 may be coupled to the transmitter of transceiver 120 and the receiver of transceiver 120 may be coupled to the transmitter of transceiver 110. I/O tunnel 140 may include command and data buses used to forward packet traffic through I/O node 100. In addition, I/O node 100 includes a peripheral interface circuit 150, which is also coupled to transceivers 110 and 120 through I/O tunnel 140. However as described above, transactions which originate at peripheral interface circuit 150 and then enter I/O tunnel 140 may be referred to as injected transactions. I/O node 100 also includes a tunnel control unit 130 which is coupled to control the transactions between transceivers 110 and 120 and peripheral interface 150. I/O node 100 is also coupled to a peripheral bus 220 through the peripheral interface circuit 150.

In the illustrated embodiment, transceivers 110 and 120 are part of two unidirectional communication paths through I/O tunnel 140. Since each of the communication paths is unidirectional, either path may be connected as the upstream or downstream path. Thus, the injected traffic from peripheral interface circuit 150 may be provided to either of transceivers 110 and 120. Transceivers 10 and 120 may each receive packet transactions into a receive buffer (not shown). As each transaction is received, a control command may be generated containing a subset of the information contained in the received command. The control command may include the Unit Id of the originating node, destination information, a data count and transaction type, for example. It is noted that the control command may include other information or may not include some of the information listed here. The control command may be sent from transceivers 110 and 120 to tunnel control unit 130. Tunnel control unit 130 may further determine which of the received transactions may be sent from a respective transceiver and to indicate to the transceiver to send the transaction to the transaction's destination.

In the illustrated embodiment, peripheral interface circuit 150 may be thought of as having a downstream section and an upstream section. The downstream section may handle downstream transactions whose destination may be a device connected to peripheral bus 220. The upstream section may handle transactions which originate from devices that may be connected to peripheral bus 220. Thus, peripheral interface circuit 150 includes a downstream command buffer 160 and a downstream data buffer 170, each coupled to I/O tunnel 140 via tunnel interface logic 155. Downstream command buffer 160 and downstream data buffer 170 are each coupled to peripheral bus 220 via bus interface circuit 210. Peripheral interface circuit 150 also includes an upstream command buffer 180 and an upstream data buffer 190, each coupled to I/O tunnel 140 via tunnel interface logic 155. Upstream command buffer 180 and upstream data buffer 190 are also each coupled to peripheral bus 220 via bus interface circuit 210. Peripheral interface circuit 150 further includes a control logic unit 200 which is coupled to both upstream command buffer 180 and downstream command buffer 160.

It is noted that in the illustrated embodiment, peripheral bus 220 is illustrative of a variety of common peripheral buses such as a PCI bus, a PCI-X bus and an AGP bus for example. Additionally, bus interface circuit 210 may include circuitry for translating peripheral bus commands from such buses. Further, it is contemplated that in one particular embodiment, bus interface circuit 210 may be a bus interface such as a Compaq™ Rapid Enabler for PCI-X (CREX) interface. Lastly, it is contemplated that in certain embodiments, I/O node 100 may include more than one peripheral interface circuit (not shown) and that I/O node may include arbitration logic (not shown) which may arbitrate between commands sent from each of the peripheral interface circuits.

Transactions may be sent from transceiver circuit 110 or 120 depending on which transceiver is connected as the downstream receiver. The command portion of the transaction may be stored in downstream command buffer 160 and the data portion of the transaction may be stored in downstream data buffer 170. Likewise, when a transaction is sent from bus interface circuit 210, the command portion of the transaction may be stored in upstream command buffer 180 and the data portion of the transaction may be stored in upstream data buffer 190. Control logic unit 200 may be configured to control the conveyance of the transactions to and from bus interface 210 and I/O tunnel 140.

As will be described in greater detail below, in response to peripheral interface circuit 150 receiving upstream transactions from peripheral bus 220, control logic unit 200 may generate control commands similar to the control commands generated by transceivers 110 and 120. Control logic unit 200 may also send those control commands to tunnel control unit 130, thus allowing upstream commands to be scheduled into I/O tunnel 140. In addition, control logic unit 200 may provide downstream circuitry with signals corresponding to upstream commands which may allow the downstream circuitry to maintain the relative order of downstream response transactions.

Figure 3:
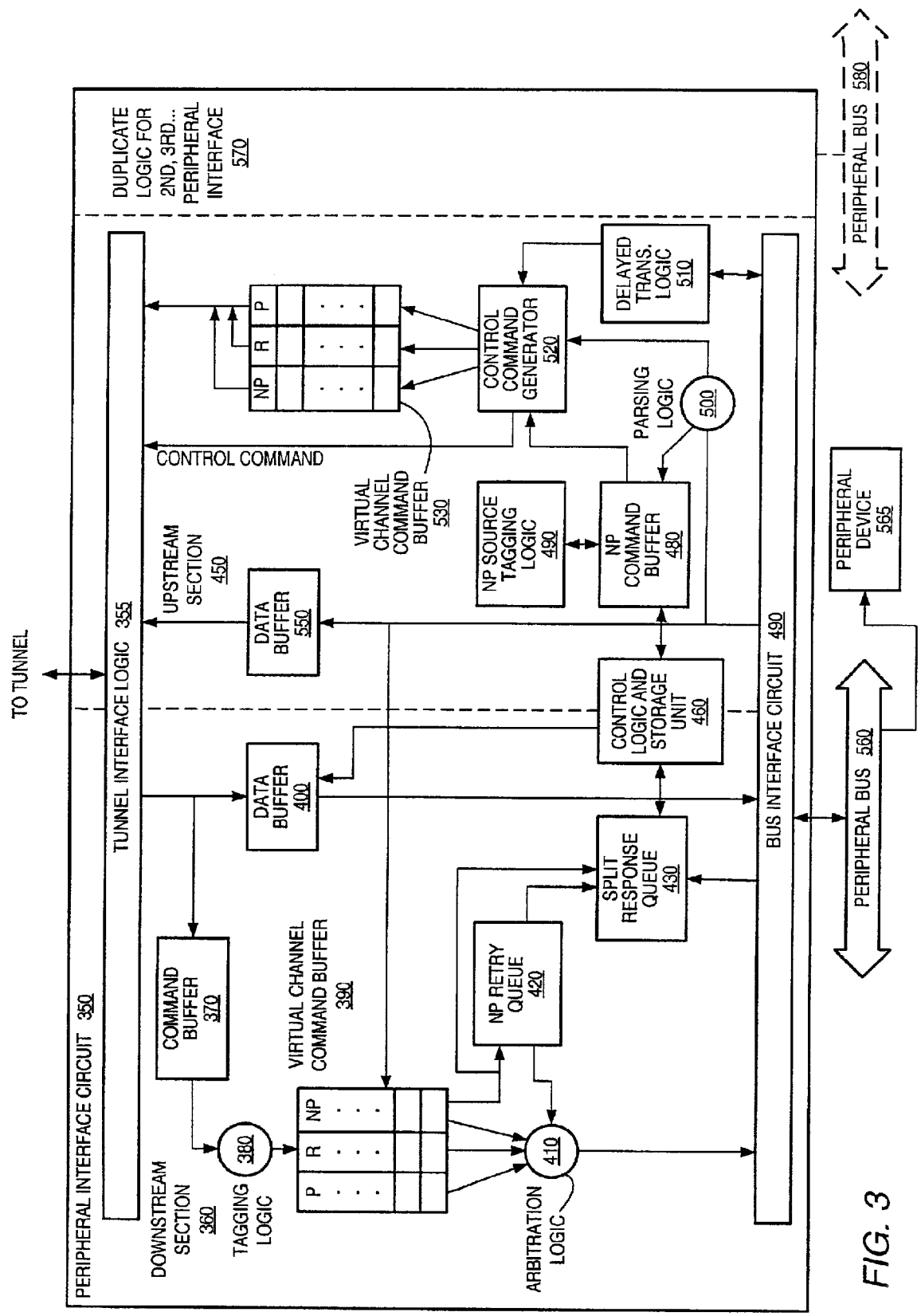
FIG. 3 is a block diagram of one embodiment of a peripheral interface circuit.

Turning to FIG. 3, a block diagram of one embodiment of a peripheral interface circuit is shown. Peripheral interface circuit 350 includes a downstream section 360 and an upstream section 450. Peripheral interface circuit 350 also includes a tunnel interface logic unit 355 which may be coupled to an I/O tunnel such as I/O tunnel 140 of FIG. 2. In downstream section 360 of FIG. 3, tunnel interface logic 355 is also coupled to a command buffer 370. Command buffer 370 is coupled to a tagging logic unit 380. Tagging logic unit 380 is coupled to a virtual channel command buffer 390. Virtual channel command buffer 390 is coupled to an arbitration logic unit 410, which is coupled to a bus interface circuit 470. Virtual channel command buffer 390 is also coupled to a non-posted (NP) retry queue 420 and a split response queue 430. Tunnel interface logic 355 is also coupled to data buffer 400 which is in turn coupled to bus interface circuit 470. Bus interface circuit 470 is coupled to a peripheral bus 560, which is coupled to a peripheral device 565.

In the upstream section 450, bus interface circuit 470 is coupled to an NP command buffer 480, a parsing logic unit 500 and a delayed transaction logic circuit 510. In addition, bus interface circuit 470 is coupled to data buffer 550. NP command buffer 480 is coupled to a control command generator 520 and to a NP source tagging logic unit 490. Control command generator 520 is coupled to a virtual channel command buffer 530 and to tunnel interface logic 355. Virtual channel command buffer 530 is coupled to tunnel interface logic 355. Peripheral interface circuit 350 also includes a control logic and storage unit 460 which is coupled to split response queue 430 and data buffer 400 of downstream section 360. Control logic and storage unit 460 is also coupled to NP source tagging logic 490 and NP command buffer 480 of upstream section 450. In addition, it is contemplated that peripheral interface circuit 350 may include duplicate logic 570 which may operate as described above for connection to additional peripheral buses such as peripheral bus 580.

Generally speaking, a "virtual channel" is a communication path for carrying packets between various processing nodes. Packets are assigned to a virtual channel based upon packet type. Packets flowing in one virtual channel are generally not affected, in terms of physical transmission, by the presence or absence of packets in another virtual channel. For example, if packets in one virtual channel are blocked from being transmitted, packets in another virtual channel may be allowed to be transmitted. However, packets in the same virtual channel may physically conflict with each other's transmission (i.e. packets in the same virtual channel may experience resource conflicts), but may not physically conflict with the transmission of packets in a different virtual channel.

Certain packets may logically conflict with other packets (i.e. for protocol reasons, coherency reasons, or other such reasons, one packet may logically conflict with another packet). If a first packet, for logical/protocol reasons, must arrive at its destination node before a second packet arrives at its destination node, it is possible that a computer system could deadlock if the second packet physically blocks the first packet's transmission (by occupying conflicting resources). By assigning the first and second packets to separate virtual channels based on their packet type, and by implementing the transmission medium within the computer system such that packets in separate virtual channels may not block each other's transmission, deadlock-free operation may be achieved. It is noted that the packets from different virtual channels are transmitted over the same physical links. However, since a receiving buffer is available prior to transmission, the virtual channels do not block each other even while using this shared resource.

From one viewpoint, each different packet type (e.g. each different command encoding) could be assigned to its own virtual channel and thus in one embodiment, separate buffers are allocated to each virtual channel. Since separate buffers may be used for each virtual channel, packets from one virtual channel may not physically conflict with packets from another virtual channel (since such packets would be placed in the other buffers).

Accordingly, in the illustrated embodiment, virtual channel command buffer 390 and virtual channel command buffer 530 each contain three separate FIFO sections which correspond to three types of transactions: posted, non-posted and response. The commands are placed into the respective FIFO in the order in which they were received. However, to maintain ordering rules associated with the bus or type of device that may have generated the original command, the transactions may have to be processed out of order between different types of transactions.

In one embodiment, command buffer 370 may be a 2-deep FIFO which may serve as a buffering mechanism for commands sent from I/O tunnel 140 of FIG. 2 to virtual channel command buffer 390 of FIG. 3. When a transaction is sent downstream to peripheral interface circuit 350, the data portion of the transaction may be stored in data buffer 400, while the command portion of the transaction may be stored in virtual channel command buffer 390. First however, tagging logic 380 may be configured to generate and append a tag value to the command. The tag value corresponds to the order of receipt of the command relative to other received commands and may be used to enforce ordering in subsequent arbitration cycles. The data and command may be identifiable as belonging to the same packet by header information which may be included in the packets. Also, since some peripheral buses may run at clock speeds slower than the internal clock speeds of the I/O node, data may be loaded into data buffer 400 using the clock speed of the I/O node and unloaded at a different clock speed, preferably at the clock speed of the peripheral bus connected to bus interface circuit 470. In addition, both data buffer 400 and virtual channel command buffer 390 may be configured to notify upstream logic such as tunnel control unit 130 of FIG. 2, for example, when space is not available.

Depending on the type of command (i.e. posted, non-posted or response) the command is stored in a respective virtual channel FIFO of virtual channel command buffer 390. Arbitration logic 410 may be configured to arbitrate which transaction may be processed first, second and so on between transactions in virtual channel command buffer 390. Virtual channel command buffer 390 and arbitration logic unit 410 may be thought of as a command scheduler, since together they store and decide in which order commands may be processed. For example, a non-posted command which arrives in virtual channel command buffer 390 after a posted command may have to be processed after the posted command due to ordering rules established by arbitration logic 410. Arbitration logic 410 may further use the tag values assigned by tagging logic unit 380 during arbitration cycles.

In addition, multiple response packets may belong to the same data stream or sequence if they originated from a common request transaction such as request for a data stream. It may be necessary depending on the peripheral bus, to deliver the response packets in the correct order within a data stream even though the packets may be received by the downstream logic out of order. In addition, it may be necessary to perform partial transfers on a peripheral bus in response to a request for a stream of data. Data buffer 400 may contain data that forms a portion of the requested data stream. As long as the data segments which make up the portion are in the correct order they may be transferred to the peripheral bus.

Control logic and storage unit 460 may determine the presence of data packets which may be stored in data buffer 400 that collectively contain a sequence of data forming the portion of the data stream. Control logic and storage unit 460 may contain storage units, such as registers or random access memory, and logic for use in delivering the data in the correct order whether the transfer is partial or complete and will be described in greater detail below in conjunction with the description of FIG. 7.

As will be described in greater detail below in conjunction with FIG. 8 and FIG. 9, during arbitration, if a winning transaction is a response command, a determination may be made as to which data associated with the response command is available in data buffer 400. If the data is available, a bus cycle may be initiated upon peripheral bus 560. This may be accomplished by bus interface circuit 470 receiving the command and data packets and translating them into address, data and control signals suitable for transmission on peripheral bus 560.

If the winning command is a non-posted command such as a read or write, depending upon the type of peripheral bus connected to bus interface circuit 470, peripheral device 565 may, for example, do one the following: accept and process the command and send a target done cycle or a response cycle with all requested data, assert a retry indication, accept the command and assert a split response indication. As will be described in greater detail below in conjunction with the description of FIG. 4, if the retry indication is asserted by peripheral device 565, the non-posted command may be retired from virtual channel command buffer 390 and stored in NP retry queue 420. As will be described in greater detail below in conjunction with the description of FIG. 5, if peripheral bus 560 is a PCI-X bus and the split response is received, the non-posted command may be retired from either virtual channel command buffer 390 or NP retry queue 420 and stored in split response queue 430.

In upstream section 450, when peripheral device 565 initiates a bus cycle upon peripheral bus 560, bus interface circuit 470 may translate that cycle into packet transactions which may include command and data packets as described above. The data packets may be stored in data buffer 550 while the commands may be stored in virtual channel command buffer 530 in the respective virtual channel. Prior to storage in virtual channel command buffer 530 and depending on the type of command, parsing logic 500 may break up the command into a number of smaller commands. For example, if peripheral device 565 requests a posted write of a large block of data to a system memory, parsing logic 500 may create a number of posted write commands of the same block of memory but in smaller blocks. It is contemplated that in one embodiment, the blocks may be created along cache line boundaries. Subsequently, each of the smaller posted commands may be stored in virtual channel command buffer 530. Non-posted read commands may also be broken up depending on the boundaries of the requests and whether the transactions are PCI or PCI-X. In one embodiment, NP source tagging logic 490 may generate a tag value that may be used by downstream logic to determine with which data stream a particular response command is associated. In addition, as will be described in greater detail below in conjunction with FIG. 6 through FIG. 9, an original non-posted command (e.g. before breaking up) may also be retained in NP command buffer 480 to provide information to logic within downstream section 360. NP source tagging logic 490 may generate a tag value associated with each of the upstream non-posted commands. In one embodiment, tag values zero through 28 may be generated. However, it is contemplated that other embodiments may generate other suitable numbers of tag values.

As upstream commands are stored in virtual channel command buffer 530, control command generator 520 may generate control commands similar to the control commands generated by transceivers 110 and 120 of FIG. 2. In FIG. 3, control command generator 520 may also send those control commands through tunnel interface logic 355 to tunnel control unit 130 of FIG. 2, thus allowing upstream commands to be scheduled into 110 tunnel 140. Tunnel interface logic 355 of FIG. 3 may include general purpose buffering circuitry as necessary for interfacing between I/O tunnel 140 and logic within peripheral interface circuit 350.

Delayed transaction logic 510 may include circuitry which may work in combination with bus interface circuit 470, logic within downstream section 360 and I/O tunnel logic of FIG. 2 to provide a retry indication to peripheral device 565 that a request may not be serviced immediately. For example, peripheral device 565 sends a non-posted read request upstream and the non-posted channel is blocked or the data is not ready. Delayed transaction logic 510 may indicate to peripheral device 565 that the request may not currently be serviced and to retry the request at a later time.

Figure 4:
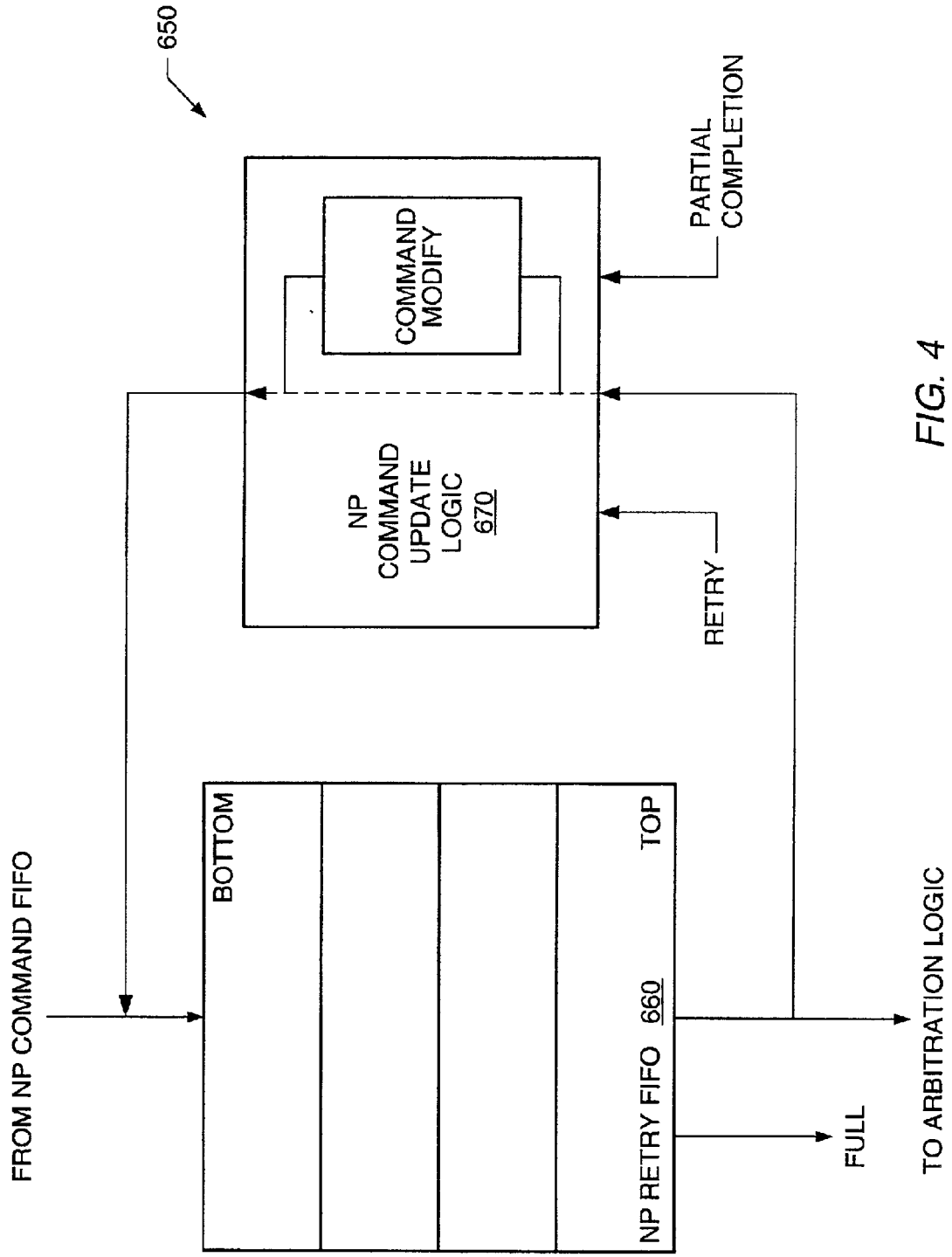
FIG. 4 is a block diagram of one embodiment of a non-posted retry buffer circuit.

Referring to FIG. 4, a block diagram of one embodiment of a non-posted retry buffer circuit is shown. A non-posted (NP) retry buffer circuit 650 includes a non-posted retry FIFO 660 coupled to a non-posted command update circuit 670.

In the illustrated embodiment, non-posted retry FIFO 660 may store non-posted commands received from a non-posted command buffer such as the non-posted command FIFO of virtual channel command buffer circuit 390 of FIG. 3. As described above in conjunction with the description of FIG. 3, in response to a retry indication being asserted by peripheral device 565, a non-posted command may be removed from virtual channel command buffer circuit 390 and stored within non-posted retry FIFO 660 of FIG. 4.

Non-posted retry FIFO 660 may assert a FIFO full signal when there are no storage locations available. The full signal may provide an indication to arbitration logic such as arbitration logic circuit 410 of FIG. 3. As long as the full signal is asserted, the non-posted command FIFO of virtual channel command buffer circuit 390 may not participate in arbitration cycles thus preventing an overflow of non-posted retry FIFO 660 in the event of an additional retry indication.

Once a non-posted command is stored within non-posted retry FIFO 660, commands at the head of the non-posted retry FIFO 660 may participate in arbitration cycles along with any commands stored within any virtual of virtual channel command buffer circuit 390 of FIG. 3. If a non-posted command stored at the head of non-posted retry FIFO 660 of FIG. 4 is selected during an arbitration cycle causing a bus cycle to be initiated and again a retry signal is asserted by peripheral bus 560 of FIG. 3, non-posted command update circuit 670 of FIG. 4 may cause the selected non-posted command to be removed from the head and stored to the tail of non-posted retry FIFO 660 to await another arbitration cycle when it again reaches the head of the FIFO. In other words, the selected non-posted command may be written back into the FIFO. This is denoted by the dashed arrow within non-posted command update circuit 670. This retrying of the cycle may happen any number of times and each time the command may be written back to the tail of non-posted retry FIFO 660.

When the peripheral interface circuit 350 of FIG. 3 is operating in a PCI mode, it is possible that peripheral bus 560 of FIG. 3 may indicate that there was a partial completion of the non-posted cycle. For example, a non-posted read command may request 10 data segments. Peripheral device 565 may assert a disconnect indication but respond with 5 of the 10 data segments thereby indicating a partial completion response. Upon receiving a partial completion indication, non-posted command update circuit 670 of FIG. 4 may modify the selected non-posted command such that a new data count and addresses corresponding to the remaining data segments may be preserved. Similarly, non-posted write commands may be partially completed. Non-posted command update circuit 670 may then cause the modified non-posted command to be stored to the tail of non-posted retry FIFO 660 where the non-posted command may await a further arbitration cycle when it reaches the head of the FIFO. As used herein and for illustrative purposes, the head of the FIFO is meant to be the location in the FIFO from which commands may be unloaded or read and the tail of the FIFO is meant to be the location that commands may be stored or written. It is also noted that as commands are unloaded from non-posted retry FIFO 660, any commands stored within non-posted retry FIFO 660 may move up in the order in which they will be unloaded. It is contemplated that in other embodiments, commands may be written to the head of the FIFO and read from the tail of the FIFO, in which case non-posted command update circuit 670 may write commands to the head of the FIFO.

Figure 5:
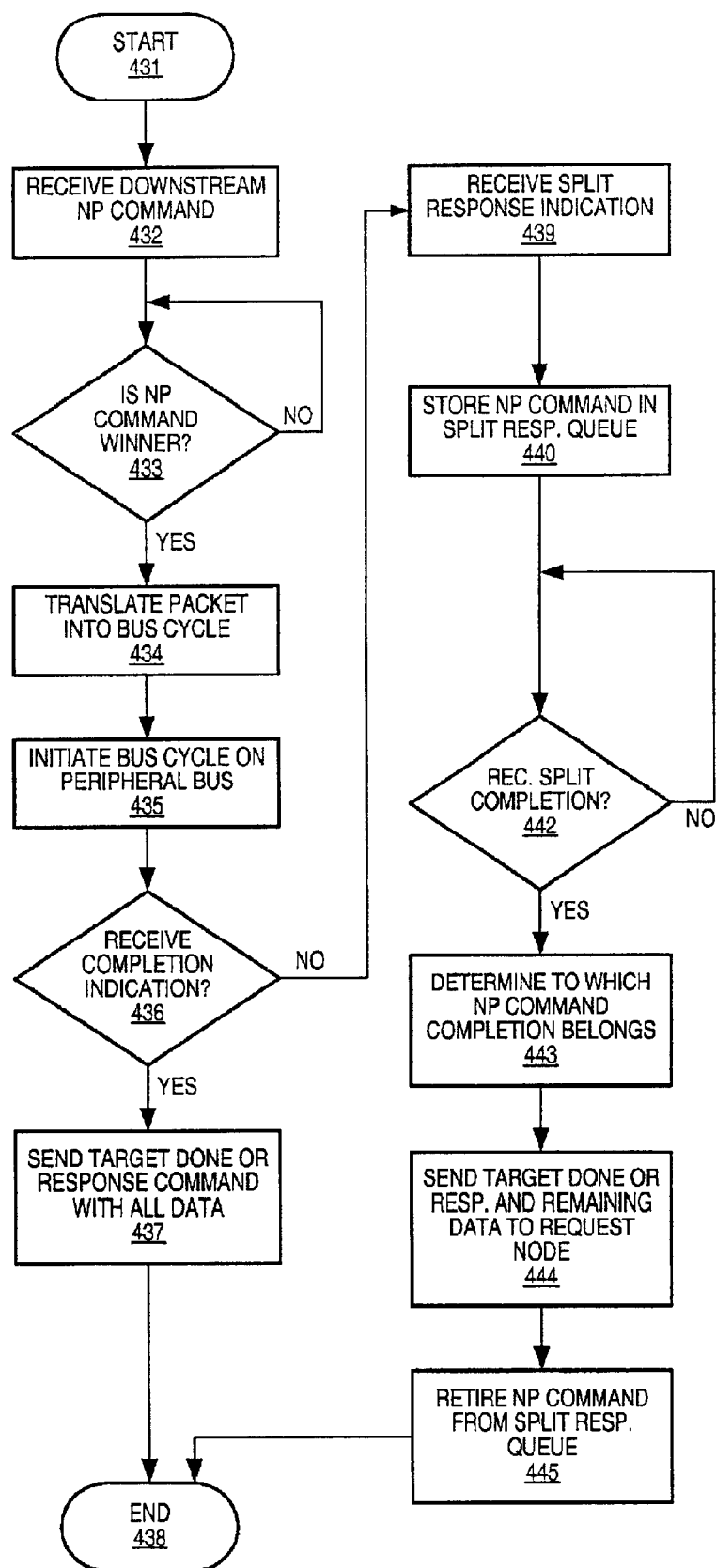
FIG. 5 is a flow diagram describing the handling of a split response indication in one embodiment of a peripheral interface circuit.

Turning to FIG. 5, a flow diagram describing the handling of a split response indication in one embodiment of a peripheral interface circuit is shown. Referring collectively to FIG. 3 and FIG. 5, operation begins with step 431 of FIG. 5 and proceeds to step 432 where a non-posted command is received by downstream section 450 of FIG. 3 and stored in the non-posted FIFO of virtual channel command buffer 390. Proceeding to step 433 of FIG. 5, arbitration cycles are performed and if the non-posted command is a winner operation proceeds to step 434, otherwise arbitration cycles continue until the non-posted command is a winner. Thus, proceeding to step 434, the non-posted command is chosen and sent to translation logic which may be included in bus interface circuit 470 of FIG. 3 for example. The non-posted command may be translated into a corresponding bus cycle suitable for transmitting onto peripheral bus 560. Proceeding to step 435 of FIG. 5, the bus cycle may then be initiated by bus interface circuit 470 of FIG. 3. It is noted that the translation and bus cycle initiation process may include one or more intermediate steps performed by one or more interfaces to a peripheral bus such as the CREX interface (not shown) discussed above in conjunction with the description of FIG. 2. Operation now proceeds to step 436 of FIG. 5. In step 435, upstream section 450 and bus interface circuit 470 of FIG. 3 await a completion indication from the target device such as peripheral device 565 on peripheral bus 560. If the non-posted command was a read request, the completion indication may comprise all of the data requested. If the non-posted command was a write request, the completion indication may be a completion message with no data. If a completion indication is received, operation proceeds to step 437 of FIG. 5. In step 437, if the non-posted command was a write command, then upstream section 450 of FIG. 3 may send a response command such as a 'target done' response, to the requesting node. If the non-posted command was a read command, then upstream section 450 may forward a response command including all requested data to the requesting node. The operational description ends in step 438 of FIG. 5.

Referring back to step 436, if the response received from peripheral bus 560 of FIG. 3 is not a completion message, it may be a retry indication which is discussed in detail in conjunction with FIG. 4. The response may also be a split response indication, where in step 439 of FIG. 5, the split response indication is received. Proceeding to step 440, the non-posted command is stored in split response queue 430 of FIG. 3 in response to the split response indication. The non-posted command may include bus cycle information such as a bus number, a device number, a function number, count and an id number. This information may be used to claim any response cycles received from the target device. Proceeding to step 442, if a split completion is received, it may be a split completion message in response to a non-posted write command or it may be a split completion including all requested data. Proceeding to step 443, the split completion cycle information is compared to any non-posted commands stored within split response queue 430 of FIG. 3. Once the corresponding non-posted command has been determined, operation proceeds to step 444 of FIG. 5. In step 444, if the split completion is a split completion message, a response command such as a 'target done' response, may be sent to the requesting node. If the non-posted command was a read command, then upstream section 450 of FIG. 3 may send a response command including all requested data to the requesting node. Proceeding to step 445 of FIG. 5, once all data or a split completion message is received, the corresponding non-posted command may be retired from split response queue 430 of FIG. 3. Referring back to step 442, if a split completion is not received, operation continues in step 442 until the split completion is received.

Figure 6:
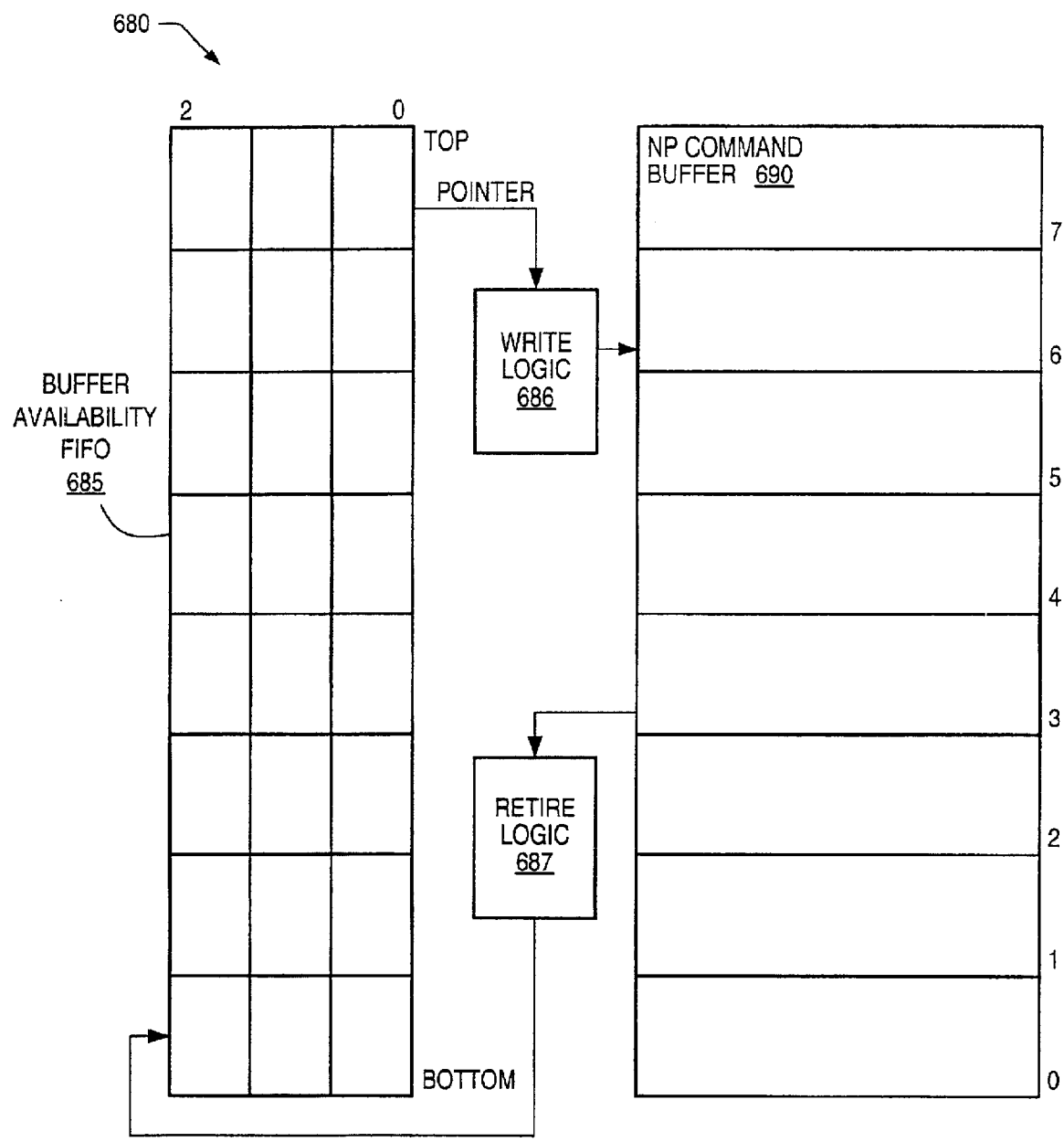
FIG. 6 is a block diagram of one embodiment of a buffer circuit including a buffer availability FIFO structure.

Referring to FIG. 6, a block diagram of one embodiment of a buffer circuit including a buffer availability FIFO structure is shown. A buffer circuit 680 includes a buffer availability FIFO 685 coupled to a non-posted command buffer 690. Buffer availability FIFO 685 is also coupled to write logic 686 and to retire logic 687.

Non-posted command buffer 690 may store non-posted commands corresponding to commands received from a peripheral bus such as peripheral bus 560 of FIG. 3. As described above in conjunction with the description of FIG. 3, upstream non-posted commands may be retained for use by downstream circuitry that may need information contained in the upstream non-posted command. To expedite storing commands into non-posted command buffer 690, buffer availability FIFO may point to the next available location within non-posted command buffer 690.

When non-posted command buffer 690 is empty, commands may be stored sequentially until non-posted command buffer 690 is full. Depending on the order of receipt of responses associated with the non-posted commands, the non-posted commands may be removed or retired out of order, thus leaving "holes" or vacant locations in an arbitrary pattern. Thus, to store any new commands into non-posted command buffer 690 available locations may be kept track of using buffer availability FIFO 685.

In the illustrated embodiment, non-posted command buffer 690 contains eight locations. Buffer availability FIFO 685 also contains eight locations and each of the eight locations within buffer availability FIFO 685 is capable of storing three bit values. The values stored into buffer availability FIFO 685 correspond to the addresses of locations within non-posted command buffer 690. Thus, each three bit values may be used as an index into non-posted command buffer 690. It is contemplated that other embodiments may have other suitable numbers of locations and other numbers of bits. Since buffer availability FIFO 685 is a FIFO structure, values may be read out in the order that they were written in. Thus in the present embodiment, values are said to be written into the bottom and read out of the top of buffer availability FIFO 685. However it is contemplated that in other embodiments, the terms top and bottom may be used reciprocally. It is also contemplated other embodiments may use read and write pointers to point to the respective locations within buffer availability FIFO 685.

Upon initialization, non-posted command buffer 690 may be empty and thus all locations may be available. Buffer availability FIFO 685 may be initialized such that the top of buffer availability FIFO 685 contains an index value corresponding to the address of location zero of non-posted command buffer 690. The next position in buffer availability FIFO 685 may contain an index value corresponding to the address of location one and so forth. Thus when a non-posted command arrives, write logic 686 may read the index value contained in the top of buffer availability FIFO 685 and subsequently cause the command to be written to the address of location zero. Once the command is stored, all the index values stored in buffer availability FIFO 685 may shift up one location such that the address of location one is now in the top position of buffer availability FIFO 685.

When a particular downstream command is completed and the corresponding non-posted command stored in non-posted command buffer 690 is no longer needed, it may be retired from non-posted command buffer 690. Thus non-posted command buffer 690 makes the location where the non-posted command was stored available and provides a corresponding indication to retire logic 687. Retire logic 687 may determine when the location becomes available and in response, cause the index value corresponding to the address of the available location to buffer availability FIFO 685 to be written into the bottom of the buffer availability FIFO 685. Thus, the top position of buffer availability FIFO 685 may contain the index value corresponding to the address of an available location when there are available locations. In the event that there no available locations in non-posted command buffer 690, write logic 686 may be inhibited from causing any commands to be stored into non-posted command buffer 690.

Figure 7:
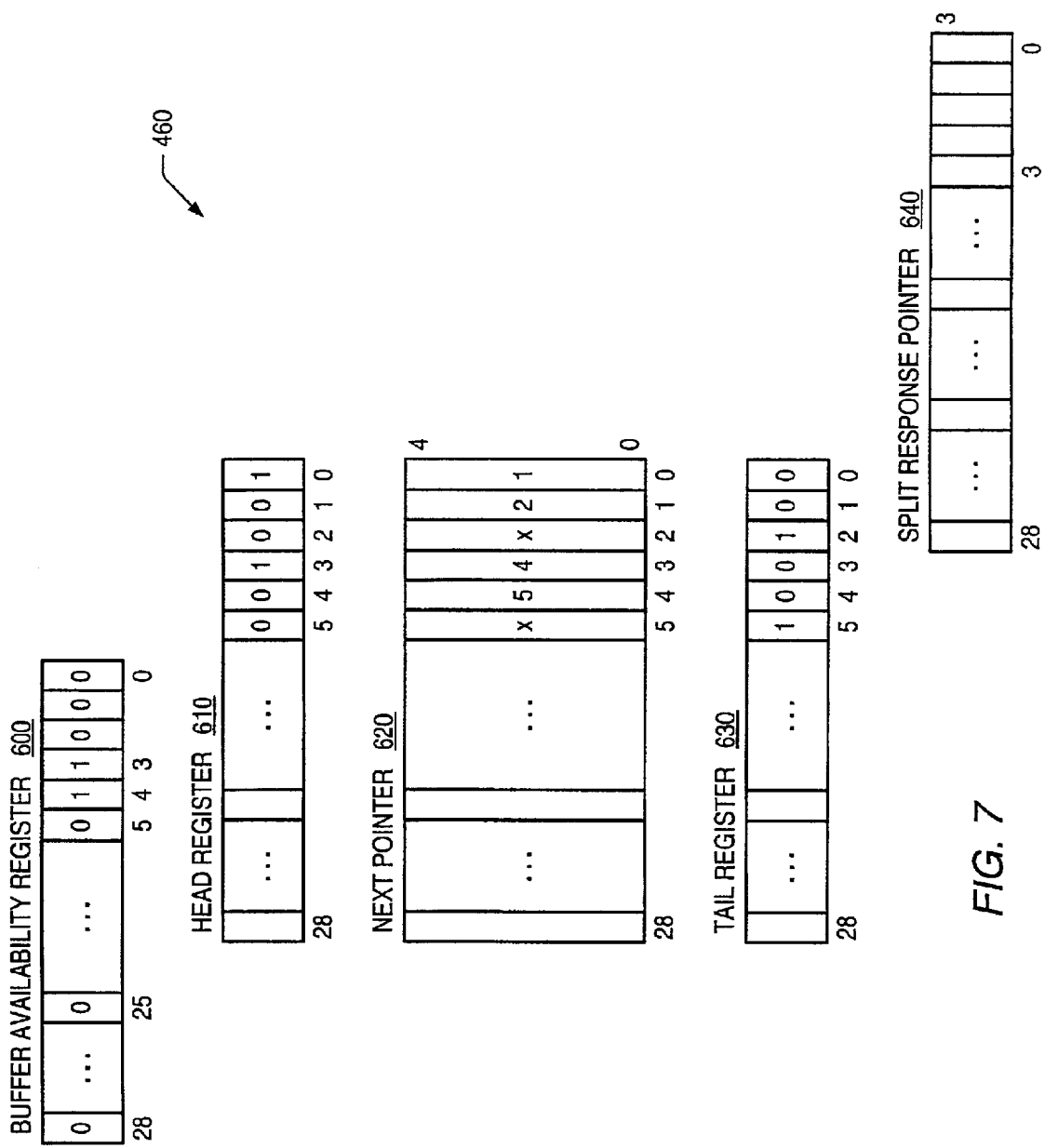
FIG. 7 is an exemplary diagram of one embodiment of a control logic and storage unit.

Referring to FIG. 7, an exemplary diagram of one embodiment of the control logic and storage unit of FIG. 3 is shown. Control logic and storage unit 460 includes a buffer availability register 600, a head register 610, a next pointer register 620, a tail register 630 and a split response pointer register 640.

In the illustrated embodiment, head register 610 contains 29 bits which correspond to the 29 possible tag values generated by NP source tagging logic unit 490 of FIG. 3. Head register 610 may be used to indicate which command packets are the first command packets of their respective data streams. To illustrate, bits zero and three are set to indicate that the command packets having tag values zero and three are head packets. As used herein, a data stream refers to any number of packets in one or more sequences of packets which may be associated with a data request. For example a non-posted read request command may be broken up into several read commands all belonging to the same data stream. For data streams containing more than one packet, the next pointer 620 and tail register 630 may be used to keep track the order of the remaining packets in the data stream.

Next pointer 620 may also contain 29 locations, each capable of storing five bits for describing at least 29 tag values. Each location therefore may be representative of one of the 29 tag values. Thus the value stored in each location of next pointer 620 may be used to point to the next location within next pointer 620. In addition, the value stored in each location also represents a tag value of the next packet in a particular data stream. Thus a sequence of values stored within next pointer 620 may be used to reconstruct or verify the order of a number of packets of a data stream that may not be received in the order that they were sent.

Tail register 630 may also contain 29 bits each corresponding to the 29 tag values. Tail register 630 may be used to indicate the tag value corresponding to the last packet in a particular data stream. In the illustrated embodiment, bits two and five are set indicating that the command packets having tag values zero and three are tail packets. It is noted that while in the embodiment described above, a tail register is used to identify the last packet in a particular data stream, it is contemplated that in another embodiment a special value may be stored within a next pointer 620 location. The special value may be indicative that the tag value corresponding to the location in which it is stored corresponds to a last packet in a particular data stream.

In the illustrated embodiment, buffer availability register 600 may also contain 29 bits each corresponding to the 29 tag values. Buffer availability register 600 may be used to indicate which of the responses associated with a particular data stream have been received. For example, data packets containing tag values three and four are received and stored in a data buffer such as data buffer 400 of FIG. 3. Accordingly, bit numbers three and four of buffer availability register 600 of FIG. 7 may indicate that the data is available by being set.

Split response pointer 640 may also contain 29 locations, each capable of storing three bits for describing up to 8 locations within a buffer such as NP command buffer 480 of FIG. 3. Each three-bit value may be used as an index value corresponding to an address of a location within NP command buffer 480 of FIG. 3. Thus, split response pointer 640 may be used to indicate which response commands are associated with an original non-posted command stored within NP command buffer 480 of FIG. 3. Thus, split response pointer 640 may be used in cases where partial transfers of data to a peripheral bus may be necessary.

It is noted that although there are 29 tag values described above, it is contemplated that other embodiments may use more or less tag values. Accordingly, it is further contemplated that head register 610, next pointer 620, tail register 630, buffer availability register 600 and split response pointer 640 may each contain more or less numbers of bits. It is further contemplated that the logic associated these registers may be reversed such that bits may be cleared instead of set to indicate a corresponding tag value.

As described above in conjunction with the description of FIG. 3, when a bus cycle is translated into a non-posted packet command by bus interface circuit 470, there may be several response packets associated with that non-posted packet command. It was also mentioned that response packets may be received by downstream section 360 out of order and that the ordering of the packets within a data stream may be maintained depending on the type of peripheral bus. As will be described in greater detail below in conjunction with the descriptions of FIG. 8 and FIG. 9, non-posted commands are received by upstream section 450 and source tag values may be generated by NP source tagging logic unit 490 for those non-posted commands. Subsequently, head register 610, next pointer 620, tail register 630, buffer availability register 600 and split-response register 640 within control logic and storage unit 460 may be used to maintain the correct order of the responses within one or more data streams using the non-posted source tag values. In addition, when responses are received, control logic and storage unit 460 may be used when transferring a sequence of data forming a portion of a data stream.

Further it is noted that other embodiments of control logic and storage unit 460 may be implemented in a different way, possibly using pointers for example. In addition, it is contemplated that other embodiments may be chosen such that control logic and storage unit 460 may contain different numbers storage units and therefore may have different functionality. For example, in one embodiment, control logic and storage unit 460 may be configured for partial transaction initiation as described below in FIG. 9.

It is noted that although the illustrated embodiment uses registers for storage, it is contemplated that other embodiments may use other suitable types of storage such as random access memory or any type of erasable programmable read only memory, for example.

Figure 8:
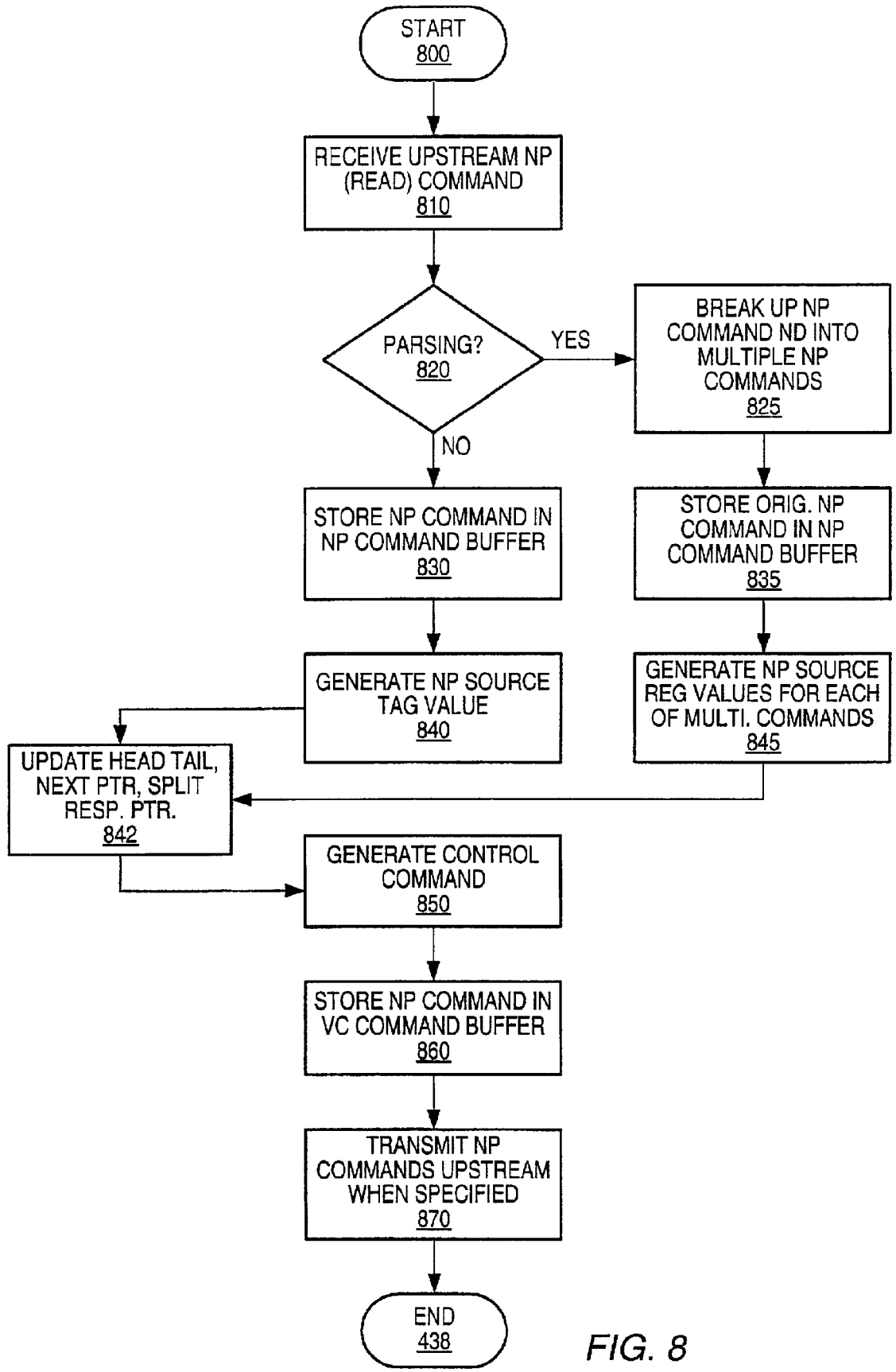
FIG. 8 is a flow diagram describing the downstream response transaction reordering operation of one embodiment of a peripheral interface circuit.

Turning to FIG. 8, a flow diagram describing a transaction reordering operation of one embodiment of peripheral interface circuit 350 of FIG. 3 is shown. Referring collectively to FIG. 3, FIG. 7 and FIG. 8, operation begins with step 800 of FIG. 8 and proceeds to step 810 where a non-posted command is received by upstream section 450 of FIG. 3. Proceeding to step 820 of FIG. 8, parsing logic 500 of FIG. 3 decides whether the non-posted command will be broken into multiple non-posted commands to satisfy upstream I/O tunnel requirements. If the transactions are PCI transactions or if the transactions are a PCI-X transactions and the non-posted command does not require being broken up, operation proceeds to step 830 of FIG. 8 where the non-posted command is stored in NP command buffer 480 of FIG. 3. Generally, PCI transactions are not broken up. For example, a non-posted read request by peripheral interface circuit 350 of FIG. 3 may be for up to a cache line boundary. However, PCI transactions are by no means precluded from being broken up in certain instances.

Operation now proceeds to step 840 of FIG. 8 where a non-posted source tag value is generated and appended to the non-posted command. Operation now proceeds to step 842 where head register 610 of FIG. 7 is updated by setting the bit corresponding to the source tag value just generated for the non-posted command. Operation now proceeds to step 850 of FIG. 8 where a control command is generated for the non-posted command by control command generator 520 of FIG. 3 and sent to I/O tunnel control logic for arbitration. Proceeding to step 860 of FIG. 8, the non-posted command is also stored within virtual channel command buffer 530 of FIG. 3 to await transmission and where in step 870 of FIG. 8 the non-posted command may be transmitted if the corresponding control command is selected by arbitration circuitry within I/O tunnel control logic.

Referring back to step 820 of FIG. 8, if parsing of the non-posted command is necessary, operation proceeds to step 825 where the non-posted command may be broken up into multiple non-posted commands belonging to the same sequence or data stream. Proceeding to step 835, the original non-posted command may be stored in NP command buffer 480 of FIG. 3. In step 845 of FIG. 8, NP source tags are generated for each of the multiple non-posted commands that were just created from the original. Operation now proceeds to step 842 where head register 610, next pointer 620, tail register 630 and split response pointer 640 of FIG. 7 are updated. Head register 610 may be updated by setting the bit corresponding to the tag value just generated for the first non-posted command within the sequence. Tail register 630 may be updated by setting the bit corresponding to the tag value just generated for the last non-posted command within the data stream.

Next pointer 620 may be updated by loading the tag values of the remaining non-posted commands within the sequence. The tag values are loaded in such a way as to link each packet in the sequence to the next packet in the sequence. To illustrate, a given data stream may consist of three packets. The packets are arranged as zero, one and two and are thus tagged as zero, one and two. Thus, bit zero of head register 610 is set and bits one and two are cleared since only one packet can be the head. To keep track of the next packets in the data stream, locations zero and one of next pointer 620 are loaded with the tag values of the next two packets, one and two respectively. Since bit zero of head register 610 is set, location zero of next pointer 620 is loaded with the tag value 'one' indicating that the packet with tag value one is the "next" packet in the data stream.

Additionally, location one of next pointer 620 is loaded with tag value 'two' indicating that the packet with tag value two is the "next" packet in the data stream. Since packet two is the last packet in the data stream, it is designated as the tail. Accordingly, bit two of tail register 630 is set. It is noted that although in the above embodiment the tag values are assigned in a numeric sequence (e.g. zero, one and two), it is contemplated that in other embodiments, the tag values may be assigned in any order and that the tag values may be assigned according to which tag values are presently available. It is also contemplated that other embodiments may contain more or less packets in a data stream and thus more or less tag values may be used.

The responses to the multiple non-posted commands which make up a data stream may be received by downstream logic out of order causing a delay in sending them to the requesting device. This delay may cause peripheral interface circuit 350 of FIG. 3 to indicate a split response for PCI-X transactions. In such a case, the downstream logic may become an originator of a number of split completion cycles and uses information contained in the original non-posted command corresponding to the multiple non-posted commands. As will be described in greater detail below in conjunction with FIG. 9, split response pointer register 640 of FIG. 7 may be used to link each of the multiple responses of a particular data stream to the original non-posted command stored in NP command buffer 480 of FIG. 3. Accordingly, each location in split response pointer register 640 of FIG. 7 may represent an NP source tag value of a corresponding response command. Each location may be loaded with an index value corresponding to the address of a location within NP command buffer 480 of FIG. 3 where the original non-posted command for that response is stored. In the above example, locations zero, one and two within split response pointer register 640 of FIG. 7 may be loaded with the index value corresponding to the address of the location within NP command buffer 480 of FIG. 3 where the original non-posted command is stored.

Operation then proceeds to step 850 of FIG. 8 where control commands for each of the multiple non-posted commands are generated and sent to I/O tunnel control logic. Further, in step 860, each of the multiple non-posted commands may be stored within virtual channel command buffer 530 of FIG. 3 to await transmission. Proceeding to step 870 of FIG. 8, each of the multiple non-posted commands may be transmitted when each corresponding control command is selected by arbitration circuitry within I/O tunnel control logic. The operational description ends in step 880.

Figure 9:
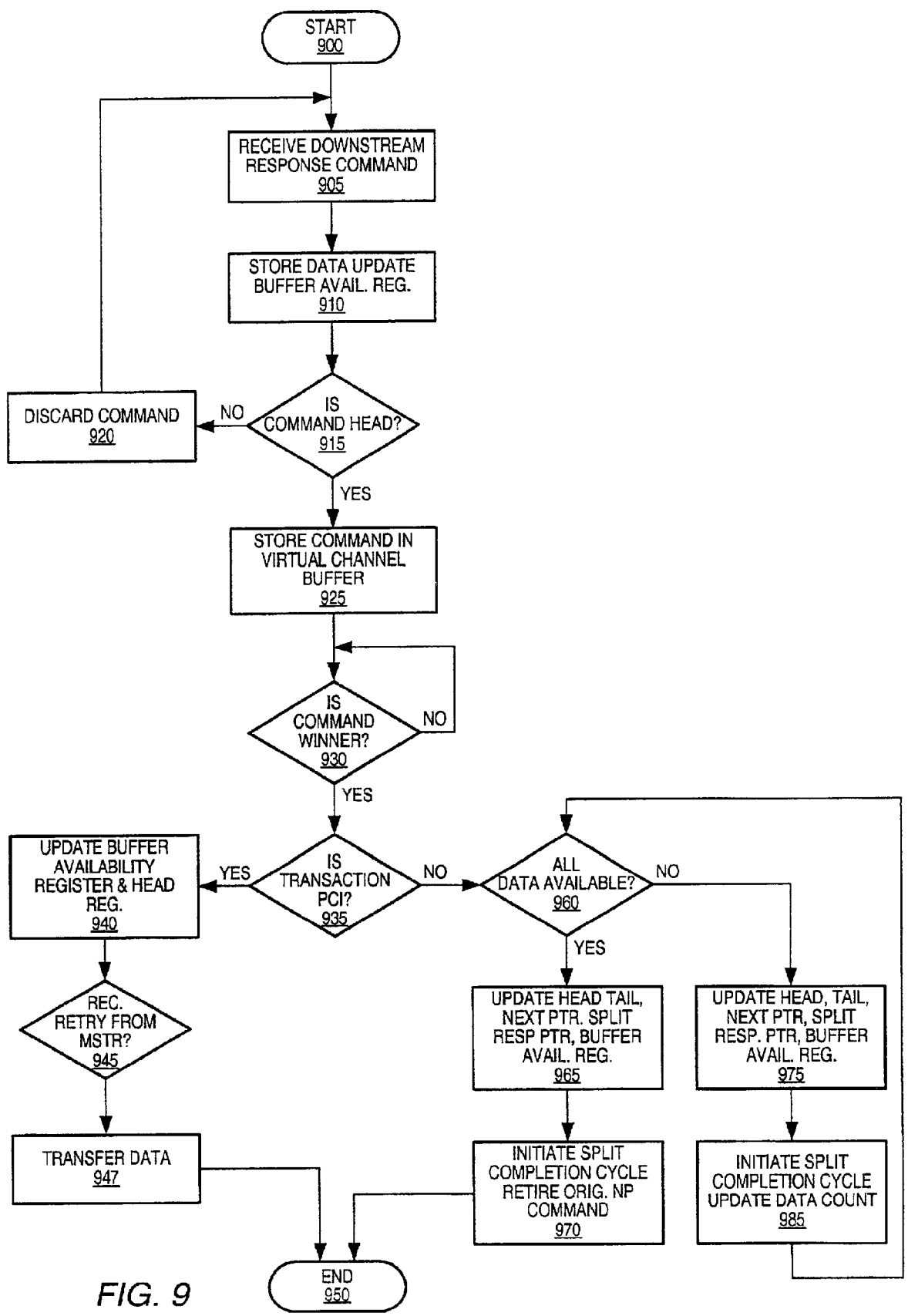
FIG. 9 is a flow diagram describing the split response operation of one embodiment of a peripheral interface circuit.

Referring to FIG. 9, a flow diagram describing the split response operation of peripheral interface circuit 350 of FIG. 3 is shown. Referring collectively to FIG. 3, FIG. 7 and FIG. 9, operation begins with step 900 of FIG. 9 and proceeds to step 905 where a response command corresponding to an upstream non-posted command is received by downstream section 360 of FIG. 3. Proceeding to step 910 a data segment associated with the response command is stored in data buffer 400 of FIG. 3. In response to receiving the data segment, buffer availability register 600 of FIG. 7 is updated by setting a bit corresponding to the NP source tag value received with the response command. Operation now proceeds to step 915 of FIG. 9 where the state of a bit in head register 610 of FIG. 7 corresponding to the tag value of the response command is checked to see if it is the head packet of a data stream. If the received response command is not a head packet, then operation proceeds to step 920 of FIG. 9 where the command is discarded and operation proceeds back to step 905 to await another response command. If the command portion is not the head, it may be discarded since it may be assumed that there will be a head packet associated with this data stream forthcoming and only the data segment may be kept. Referring back to step 915, if the response command is a head packet, operation proceeds to step 925 where the response command may be assigned an arbitration tag value by tagging logic 380 of FIG. 3 and stored within the response channel of virtual channel command buffer 390.

Proceeding to step 930 of FIG. 9 the arbitration logic 410 of FIG. 3 arbitrates a winning command from virtual channel command buffer 390. If the response command is not the winning command, operation stays within step 930 where arbitration continues. If on the other hand, the response command is the winning command, operation proceeds to step 935. In step 935, if the transactions are PCI transactions and all data packets are available, operation proceeds to step 940 where the head register 610, next pointer 620, tail register 630 and buffer availability register 600 of FIG. 7 are updated so that the tag values associated with the I/O stream may be reused by NP source tagging logic 490 of FIG. 3. In addition, the original non-posted command may be retired from NP command buffer 430 of FIG. 3. Proceeding to step 945 of FIG. 9, downstream logic waits for a retry from the external master (i.e. the originator of the NP original non-posted command). When the retry is received, operation proceeds to step 947 of FIG. 9 where all requested data may be transferred upon peripheral bus 560 of FIG. 3 in response to the external master retrying the cycle.

Referring back to step 935, if the transactions are PCI-X transactions, then operation proceeds to step 960 where it may be necessary to determine which data packets associated with this data stream are available. This may be accomplished by checking the combination of the next pointer 620, tail register 630 and buffer availability register 600 of FIG. 7. If all the data packets have arrived, operation proceeds to step 965 of FIG. 9. In step 965, the head register 610, next pointer 620, tail register 630, buffer availability register 600 and split response pointer 640 of FIG. 7 may be updated so that the tag values associated with the data stream may be reused by NP source tagging logic 490 of FIG. 3. Proceeding to step 970 of FIG. 9, a completion cycle may be initiated indicating that all response data is being sent to the requesting device. To initiate the completion cycle, peripheral interface circuit 350 of FIG. 3 now becomes the source device and may initiate a split completion cycle. To initiate the split completion cycle, information contained in the original non-posted cycle corresponding to the current response packet stored within NP command buffer 480 of FIG. 3 may be needed. Thus, the location corresponding to the source tag value of the split response is read from split response pointer register 640 of FIG. 7. The information contained in the original non-posted cycle is retrieved and the split completion cycle is initiated. In addition, the original non-posted command may be retired from NP command buffer 430 of FIG. 3.

Referring back to step 960, if only some of the data packets associated with the data stream have arrived, and the available data packets have been identified, then operation proceeds to step 975 where the head register 610, next pointer 620, buffer availability register 600 and split response pointer 640 of FIG. 7 are updated. However, since only some of the data packets are available, a split completion cycle may be generated. The split completion transaction may include a command packet and any data segments stored within data buffer 400 of FIG. 7 that may collectively make up a sequence of data forming a portion of the data stream. Accordingly, head register 610 and next pointer 620 of FIG. 9 may be updated to reflect a new head and next packets of the data stream. Proceeding to step 985, a split completion bus cycle is initiated upon peripheral bus 560 of FIG. 3. Similar to the above case, information contained in the original non-posted cycle corresponding to the current response packet stored within NP command buffer 480 of FIG. 3 may be needed to initiate the split completion cycle. Thus, the location corresponding to the source tag value of the split response is read from split response pointer register 640 of FIG. 7. The information contained in the original non-posted cycle is retrieved and the split completion cycle is initiated. However in contrast to the above case, to correctly initiate a split completion bus cycle, bus interface circuit 470 of FIG. 3 may be notified of the amount of data being sent in the split completion command by including the corresponding count in the data count field of the packet. The count reflects the number of data blocks being sent. Proceeding back to step 960 of FIG. 9, as subsequent response commands are received containing the remaining data packets, the remaining data packets which forming the remaining portion of the data stream may be sent to the requesting device using additional split completion cycles. When the rest of the data is sent, a split completion cycle may be initiated and the original non-posted command may be retired from NP command buffer 430 of FIG. 3. The operational description ends in step 950 of FIG. 9.

Figure 10:
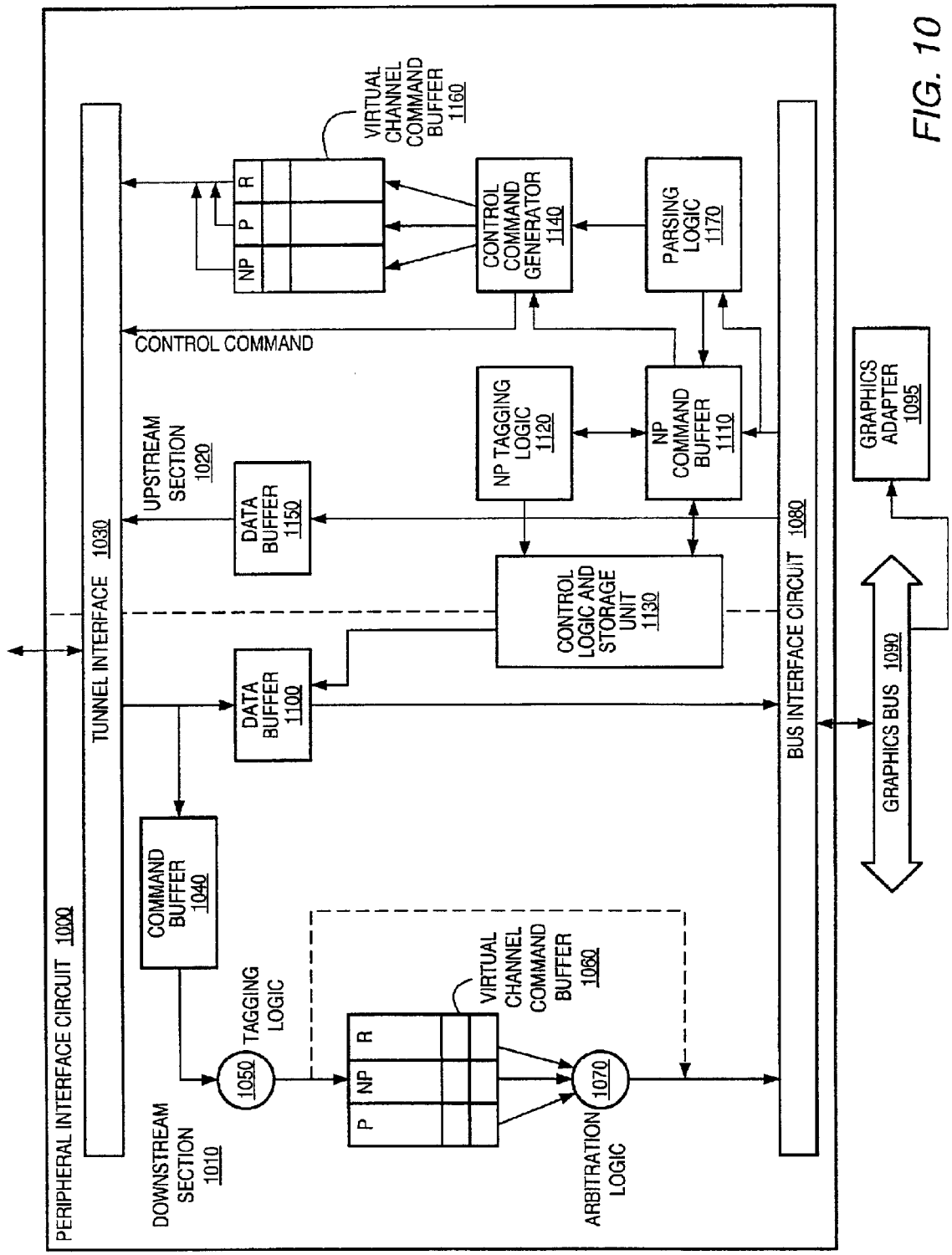
FIG. 10 is a block diagram of one embodiment of a peripheral interface circuit for connection to a graphics bus.

Turning to FIG. 10, a block diagram of one embodiment of a peripheral interface circuit for connection to a graphics bus is shown. Peripheral interface circuit 1000 includes a downstream section 1010 and an upstream section 1020. Peripheral interface circuit 1000 also includes a tunnel interface 1030 which may be coupled to an I/O tunnel such as I/O tunnel 140 of FIG. 2. In downstream section 1010 of FIG. 10, tunnel interface 1030 is also coupled to a command buffer 1040. Command buffer 1040 is coupled to a tagging logic unit 1050. Tagging logic unit 1050 is coupled to a virtual channel command buffer 1060. Virtual channel command buffer 1060 is coupled to an arbitration logic unit 1070, which is coupled to a bus interface circuit 1080. Tunnel interface 1030 is also coupled to data buffer 1100 which is in turn coupled to bus interface circuit 1080. Bus interface circuit 1080 is coupled to a graphics bus 1090, which is coupled to a graphics adapter 1095. In a preferred embodiment, graphics bus 1080 is an Accelerated Graphics Port (AGP) bus, although it is contemplated that other embodiments may use other types of graphics buses.

In upstream section 1020, bus interface circuit 1080 is coupled to an NP command buffer 1110 and to parsing logic 1170. In addition, bus interface circuit 1080 is coupled to data buffer 1150. NP command buffer 1110 is coupled to a control command generator 1140 and to a NP source tagging logic unit 1120. Control command generator 1140 is coupled to a virtual channel command buffer 1160 and to tunnel interface 1030. Virtual channel command buffer 1160 is also coupled to tunnel interface 1030. Peripheral interface circuit 1000 also includes a control logic and storage unit 1130 which is coupled to data buffer 1100 of downstream section 1010. Control logic and storage unit 1130 is also coupled to NP source tagging logic 1120 and NP command buffer 1110 of upstream section 1020.

In the illustrated embodiment, virtual channel command buffer 1060 and virtual channel command buffer 1160 each contain three separate FIFO sections which correspond to three types of transactions: posted, non-posted and response. The commands are placed into the respective FIFO in the order in which they were received. However, to maintain ordering rules associated with the bus or type of device that may have generated the original command, the transactions may have to be processed out of order between different types of transactions. This may be accomplished by the command scheduler which includes the combination of virtual channel command buffer 1060 and arbitration logic 1070.

In one embodiment, command buffer 1040 may be a 2-deep FIFO which may serve as a buffering mechanism for commands sent from I/O tunnel 140 of FIG. 2 to virtual channel command buffer 1090 of FIG. 10. When a transaction is sent downstream to peripheral interface circuit 1000, the data portion of the transaction may be stored in data buffer 1100, while the command portion of the transaction may be stored in virtual channel command buffer 1060. First however, tagging logic 1050 may be configured to generate and append a tag value to the command. The tag value may correspond to the order of receipt of the command relative to other received commands and may be used in subsequent arbitration cycles. The data and command may be identifiable as belonging to the same packet by header information which may be included in the packets. Also, since graphics buses may run at clock speeds slower than the internal clock speeds of the I/O node, data may be loaded into data buffer 1100 using the clock speed of the I/O node and unloaded at a different clock speed, preferably at the clock speed of the graphics bus connected to bus interface circuit 1080. In addition, both data buffer 1100 and virtual channel command buffer 1060 may be configured to notify upstream logic such as tunnel control unit 130 of FIG. 2, for example, when space is not available within either buffer.

Since some graphics adapters were originally implemented using the PCI bus for communicating with system memory, graphics adapters such as graphics adapter 1095 may still include PCI logic which may be capable of initiating PCI bus transactions upon graphics bus 1090. In addition, configuration commands initiated by other devices such as a system processor may be sent to graphics adapter 1095 using a PCI command via graphics bus 1090. Thus, in addition to translating AGP bus cycles into packet commands and packet commands into AGP bus cycles, bus interface circuit 1080 may also translate packet commands into PCI bus cycles suitable for transmission on graphics bus 1090.

Depending on the type of command (i.e. posted, non-posted or response) the command is stored in a respective virtual channel FIFO of virtual channel command buffer 1060, which is similar to operation of downstream section 360 of FIG. 3. In FIG. 10, arbitration logic 1070 may be configured to arbitrate which transaction may be processed first, second and so on between transactions in virtual channel command buffer 1060. Arbitration logic 1070 may further use the tag values assigned by tagging logic unit 1050 during arbitration cycles. In addition, for PCI responses, multiple response packets may belong to the same data stream or sequence if they originated from a common request transaction. It may be necessary to deliver the response packets belonging to a given data stream in the correct order even though the packets may be received by the downstream logic out of order. This operation may be similar to the description given in conjunction with FIG. 9 for PCI responses.

As will be described in greater detail below in conjunction with the description of FIG. 11, an AGP response received by downstream section 1010 may not be stored within virtual channel command buffer 1060 and may not participate in arbitration cycles. The AGP response may instead bypass the buffers within virtual channel command buffer 1060 and the data associated with the response command may be sent to bus interface 1080. However since AGP responses may need to be delivered in a specified order, control logic and storage unit 1130 may contain logic and storage units, such as registers for use in delivering the packets in the correct order and will be described in greater detail below in conjunction with the description of FIG. 12.

When graphics adapter 1095 initiates an AGP transaction upon graphics bus 1090, bus interface circuit 1080 may translate that transaction into packet transactions which may include command and data packets as described above. The data packets may be stored in data buffer 1150 while the commands may be stored in virtual channel command buffer 1160 in the respective virtual channel. Prior to storage in virtual channel command buffer 1160 and depending on the type of command, parsing logic 1170 may break up the command into a number of smaller commands. For example, if graphics adapter 1095 requests a read of a large block of data from system memory, parsing logic 1170 may create a number of non-posted read commands of the same block of memory but in smaller blocks. It is contemplated that in one embodiment, the blocks may be created along cache line boundaries. Subsequently, each of the newly created non-posted commands may be stored in virtual channel command buffer 1160 and the original non-posted command may be stored in NP command buffer 1110.

In the illustrated embodiment, NP source tagging logic 1120 may generate a tag value that may be used by downstream logic to determine with which data stream a particular response command is associated. NP source tagging logic 490 may generate a tag value associated with each of the upstream non-posted commands. In one embodiment, tag values zero through 28 may be generated. However, it is contemplated that other embodiments may generate other suitable numbers of tag values.

As upstream commands are stored in virtual channel command buffer 1160, control command generator 1140 may generate control commands similar to the control commands generated by transceivers 110 and 120 of FIG. 2. In FIG. 10, control command generator 1140 may also send those control commands through tunnel interface 1030 to a control unit such as tunnel control unit 130 of FIG. 2, for example, thus allowing upstream commands to be scheduled into I/O tunnel 140. Tunnel interface 1030 of FIG. 10 may include general purpose buffering circuitry as necessary for interfacing between I/O tunnel 140 and logic within peripheral interface circuit 1000.

Figure 11:
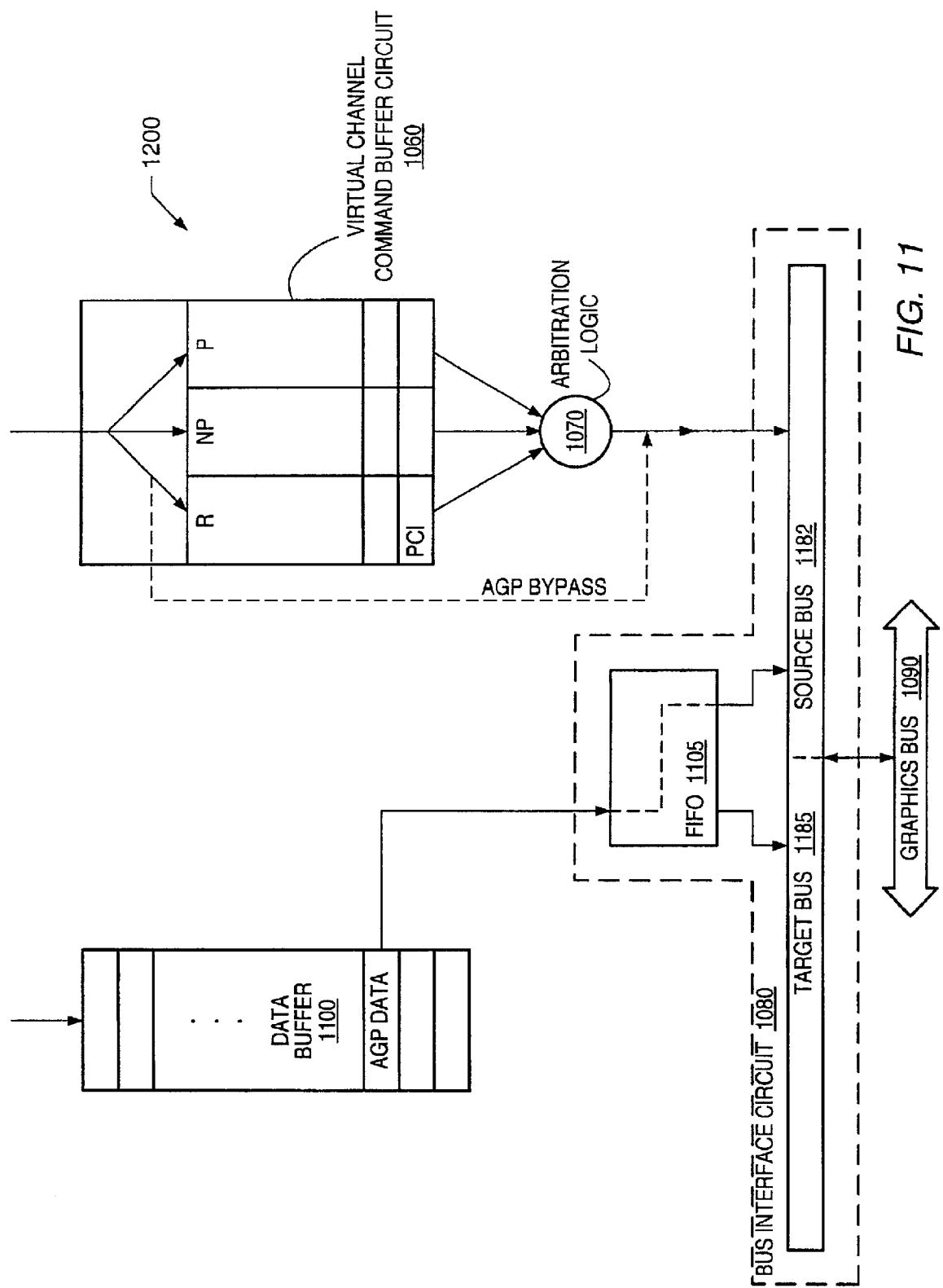
FIG. 11 is a diagram of one embodiment of a peripheral interface circuit for handling graphics responses.

Referring to FIG. 11, a diagram of one embodiment of a peripheral interface circuit for handling graphics responses is shown. Circuit components that correspond to those shown in FIG. 10 are numbered identically for simplicity and clarity. The peripheral interface circuit includes a bypass mechanism 1200 which includes a data buffer 1100 which is coupled to a bus interface circuit 1080. Bus interface circuit 1080 includes a FIFO buffer 1105 which is coupled to a target bus 1185 and a source bus 1182. Source bus 1182 and target bus 1185 are coupled to a graphics bus 1090. Bypass mechanism 1200 also includes virtual channel command buffer circuit 1060 which is coupled to arbitration logic 1070. Arbitration logic 1070 is also coupled to bus interface circuit 1080. In addition, bypass mechanism 1200 includes an AGP Bypass connection that couples the response channel of virtual channel command buffer circuit 1060 to bus interface circuit 1080.

As described above in conjunction with FIG. 10, as downstream responses and commands are received, they may be stored in a respective virtual channel FIFO of virtual channel command buffer circuit 1060. In FIG. 11, as arbitration cycles determine winning commands, the data associated with a winning command may be transferred to FIFO buffer 1105. As long as data is present in FIFO 1105, bus interface 1080 may initiate bus cycles suitable for transmission on graphics bus 1090. As bus cycles are completed and each winning command is retired from virtual channel command buffer circuit 1060, the remaining commands within a given virtual channel FIFO may move toward the head of that FIFO. Eventually, each command may be read out and may participate in arbitration cycles unless the command is an AGP response command.

In the illustrated embodiment, bus interface circuit 1080 includes two separate buses: source bus 1182 and target bus 1185. Source bus 1182 and target bus 1185 may be used by bus interface 1080 to convey packet transactions between graphics bus 1090 and an upstream node. Source bus 1182 may be used to convey commands initiated by a graphics device connected to graphics bus 1090. Target bus 1185 may be used to convey commands initiated by other devices not on graphics bus 1090, such as a system processor, for example. In FIG. 1, source bus 1182 and target bus 1185 each include a command channel and a response channel (not shown). The command channel of the source bus may be used to convey commands such as posted and non-posted commands initiated by a device on said graphics bus. The response channel of the source bus may be used for conveying response commands generated by a device not on the graphics bus but which correspond to posted and non-posted commands initiated by a device on the graphics bus. In addition, the command channel of the target bus may be used to convey commands such as posted and non-posted commands initiated by devices not on the graphics bus. The response channel of the target bus may be used for conveying response commands generated by a device on the graphics bus but which correspond to posted and non-posted commands initiated by a device not on the graphics bus.

Since there are two separate buses used for conveying transactions, downstream AGP and PCI response commands may be conveyed upon the response channel of source bus 1182, while any downstream posted or non-posted commands may be conveyed upon target bus 1185. To illustrate by example, an AGP transaction such as a non-posted read command is initiated by a graphics device connected to graphics bus 1090. The transaction is translated into packets by bus interface circuit 1080 and conveyed upon the command channel of source bus 1182 to upstream section 1020 of FIG. 10 where the command is sent to a host node (not shown) for processing. At some later time, an AGP response corresponding to the previous AGP command is received by downstream logic. Due to the availability of the response channel of source bus 1182 and the separate command channel of target bus 1187, the AGP response does not get stored in the response channel of virtual channel command buffer circuit 1060 and therefore does not participate in any arbitration cycles. The AGP response is allowed to bypass the response channel buffer of virtual channel command buffer 1060 and be conveyed to bus interface circuit 1090. All other types of commands stored within virtual channel command buffer circuit 1060 may participate be stored in virtual channel command buffer circuit 1060 and may participate in arbitration cycles. This may be in contrast to a PCI transaction such as a non-posted read command initiated by a graphics device connected to graphics bus 1090. The downstream PCI response which arrives at some later time will be stored in the response channel buffer of virtual channel command buffer circuit 1060 and does participate in any arbitration cycles. It may be necessary for the PCI responses to be scheduled due to the PCI ordering rules.

Figure 12:
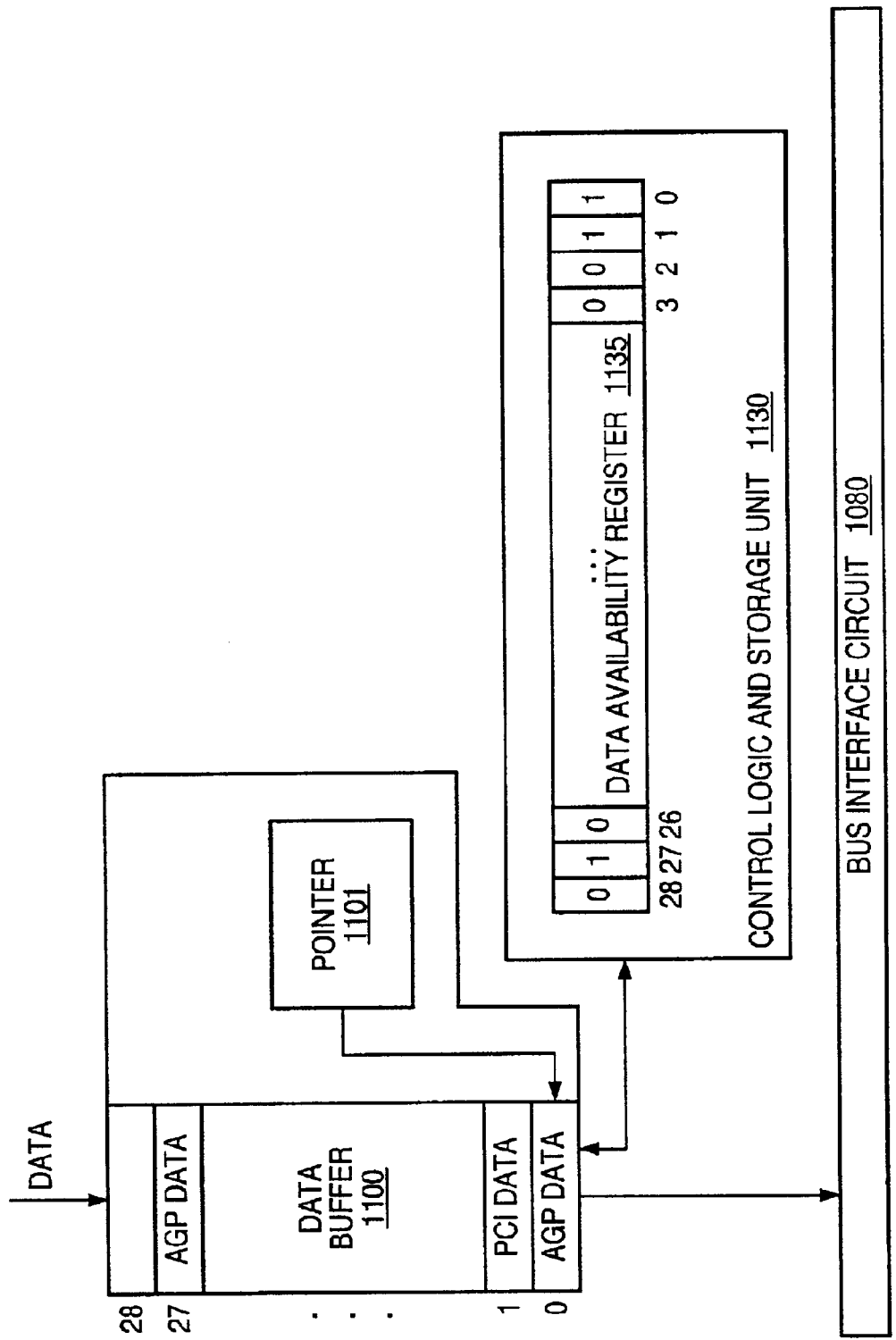
FIG. 12 is a diagram of one embodiment of an apparatus for reordering graphics responses.

Turning now to FIG. 12, a diagram of one embodiment of an apparatus for reordering graphics responses is shown. Circuit components that correspond to those shown in FIG. 10 and FIG. 11 are numbered identically for simplicity and clarity. The transaction reordering apparatus includes a data buffer 1100 including a pointer 1101 and a control logic and storage unit 1130. Data buffer 1100 is coupled to control logic and storage unit 1130 and to a bus interface circuit 1080. Control logic and storage unit 1130 includes a data availability storage unit 1135. In the illustrated embodiment data availability storage unit 1135 is a register. However it is contemplated that other embodiments may use any suitable storage device such as random access memory, for example.

As mentioned above, graphics responses such as AGP responses, unlike PCI and PCI-X responses, may only be sent back to the initiating device in the order in which they were requested regardless of which data stream they belong to. Thus, downstream AGP responses may be sent to the initiating device in a different order than they are received by data buffer 1100. For example, a first request is sent upstream and is associated with a first data stream. This is followed by a second request associated with a second data stream. Some time later, only a portion of the response data packets corresponding to the first data stream have been received and stored within data buffer 1100. However, all the response data packets of the second data stream have been received and stored within data buffer 1100. The data packets from the second data stream may not be sent until the remaining data packets from the first data stream have been received and subsequently transferred to bus interface 1080 for translation into bus cycles.

In the illustrated embodiment, data buffer 1100 may be a random access memory unit that includes at least 29 storage locations each corresponding to the 29 tag values that may be assigned to commands by NP tagging logic 1120 of FIG. 10. As each data packet arrives, it may be stored in a location corresponding to the tag value of the received data packet. In FIG. 12, pointer 1101 may point to the location which is expected to contain the data of the next sequential AGP data segment to be sent to bus interface 1080. Further, data availability register 1135 may include at least 29 bits each corresponding to the 29 tag values that may be assigned to commands by NP tagging logic 1120 of FIG. 10. The data availability register 1135 of FIG. 12 may be used to indicate which data packets have been received, while pointer 1101 points to the next AGP response location in data buffer 1100. To illustrate, data packets containing tag values zero, one and 27 are received. The data packets are stored in location numbers zero, one and 27, respectively, within data buffer 1100. Accordingly, bit numbers zero, one and 27 of data availability register 1135 may be set, thereby indicating which data is available, while pointer 101 points to the location corresponding to tag value zero, the next AGP data to be sent. Although it is contemplated that in other embodiments data availability register 1135 may indicate that the data is available by being cleared. Accordingly, each time a downstream AGP response is received, the corresponding data may be stored in data buffer 1100 and data availability register 1135 may be updated to reflect which data packets have been stored within data buffer 1100. The operation of the mechanism of FIG. 12 will be described in greater detail below in conjunction with FIG. 13.

Figure 13:
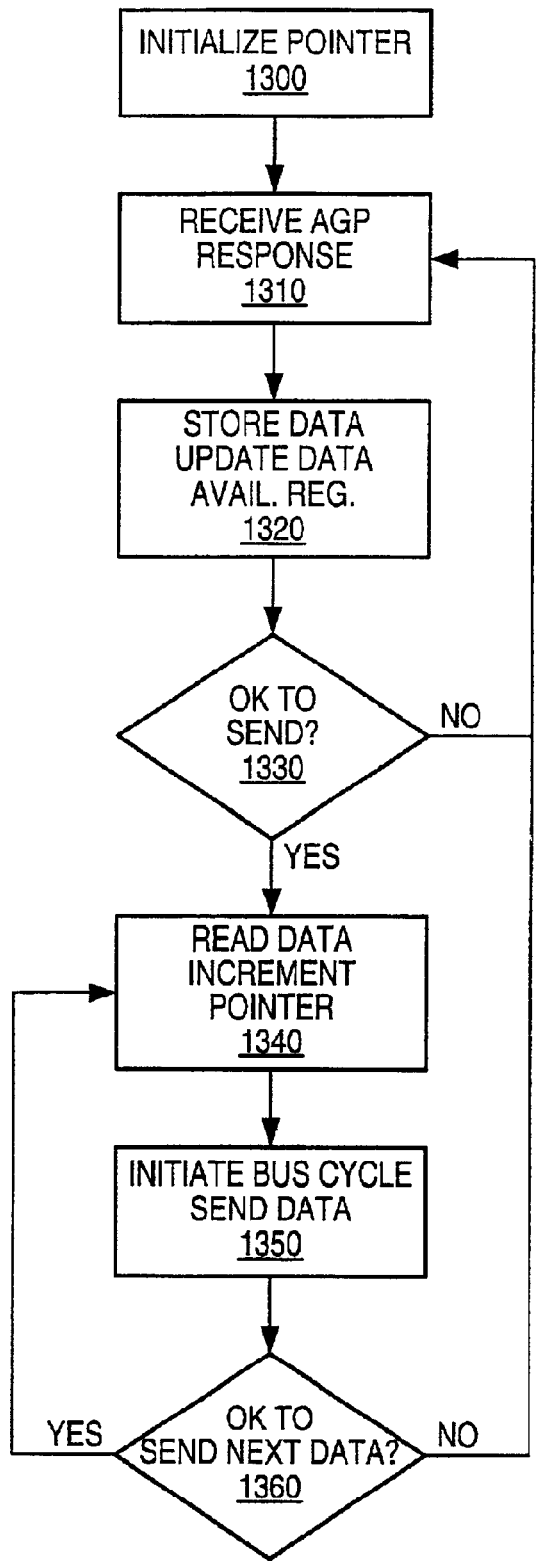
FIG. 13 is a flow diagram describing the operation of one embodiment of a transaction reordering apparatus for graphics responses.

Referring to FIG. 13, a flow diagram describing the operation of one embodiment of a transaction reordering mechanism for graphics responses is shown. Referring collectively to FIG. 10, FIG. 12 and FIG. 13, operation begins in step 1300 of FIG. 13. In step 1300, upon system initialization, pointer 1101 of FIG. 12 may be initialized to a predetermined value such as zero, for example. In conjunction with the initialization of pointer 1101, NP tagging logic 1120 of FIG. 10 may also be initialized to the same predetermined value, thereby synchronizing the tagging logic and the pointer. Thus, pointer 1101 of FIG. 12 is now pointing to the next location in data buffer 1100 from which data may be read. Accordingly, after initialization, the first AGP response which may be sent to bus interface circuit 1080 may have a tag value of zero. It is noted that although the initialization value used in the present embodiment is zero, it is contemplated that in other embodiments other suitable initialization values may be used.

Proceeding to step 1310 of FIG. 13, AGP response commands may be received by downstream section 1010 of FIG. 10 and identified as AGP responses by one or more identifying bits in a command header associated with the response. Proceeding to step 1320 of FIG. 13, the data portion of the response may be stored within a location of data buffer 1100 of FIG. 12 that corresponds to the tag value of the response. In addition, the corresponding bit in data availability register 1135 may be set indicating the presence of data in that location in data buffer 1100. It is contemplated that other embodiments may clear the corresponding bit in data availability register 1135 to indicate the presence of data. Proceeding to step 1330 of FIG. 13, since pointer 1101 of FIG. 12 is pointing to the location in data buffer 1100 from which the next AGP response data may be read, an indication of the tag value of the newly received data segment may be provided by pointer 1101 and compared with an indication from data availability register 1135 of whether the data having that tag value is available. If there is no match, the command portion of the response may be discarded and operation proceeds back to step 1310 of FIG. 13. Referring back to step 1330, if there is a match, then operation proceeds to step 1340 where the data stored in the location pointed to by pointer 1101 of FIG. 12 may be read out of data buffer 1100 and pointer 101 may be incremented. Proceeding to step 1350 of FIG. 13, a bus cycle may be initiated by bus interface circuit 1080 of FIG. 12 thereby sending the response data to the requesting device.

Proceeding to step 1360 of FIG. 13, since pointer 1101 of FIG. 12 has been incremented and may now be pointing to the location in data buffer 1100 from which the next AGP response data may be read, a corresponding tag value indication may be provided and compared with an indication from data availability register 1135 whether the data having that tag value is available. If there is a match, operation proceeds back to step 1340 of FIG. 13 where the data may be read out of data buffer 1100 of FIG. 12 and pointer 1101 may be incremented. Again in step 1350 of FIG. 13, a bus cycle may be initiated by bus interface circuit 1080 of FIG. 12, thereby sending the next response data to the requesting device. Referring back to step 1360 of FIG. 13, if there is no match indicating that the next data is not available, operation proceeds back to step 1310 to await further AGP responses.

This process may continue for each received AGP response. Therefore as AGP responses are received, if the AGP responses are received in a different order than they were originally requested, each of the out of order response commands may be disregarded and the data may be stored to await the AGP response which is in the correct order.

Numerous variations and modifications will become apparent to those skilled in the art once the above disclosure is fully appreciated. It is intended that the following claims be interpreted to embrace all such variations and modifications.

What is claimed is:

1. An apparatus for performing partial transfers on a peripheral bus in response to a request for a stream of data, said apparatus comprising:
   a data buffer configured to store one or more data packets each containing data forming a portion of said data stream, wherein each of said data packets corresponds to one or more commands belonging to a response virtual channel;
   a control unit coupled to said data buffer and configured to determine the presence of data packets stored in said data buffer that collectively contain a sequence of data forming a portion of said data stream; and
   a command buffer coupled to said data buffer and configured to store said one or more commands within said command buffer in response to said one or more commands being a start command of said portion of said data stream;
   wherein in response to said start command winning an arbitration, said control unit is further configured to cause said sequence of data to be conveyed on said peripheral bus.

2. The apparatus as recited in claim 1 further comprising a bus interface circuit configured to cause one or more bus cycles to be initiated and thereby conveying said sequence of data upon said peripheral bus.

3. The apparatus as recited in claim 2, wherein each of said one or more bus cycles includes an address corresponding to each data packet contained in said sequence of data.

4. The apparatus as recited in claim 3, wherein said control unit is further configured to cause information corresponding to a bus cycle associated with said request for a stream of data to be provided to said bus interface circuit.

5. The apparatus as recited in claim 4, wherein said request for a stream of data belongs to non-posted channel.

6. A method for performing partial transfers on a peripheral bus in response to a request for a stream of data, said method comprising:
   storing one or more data packets each containing data forming a portion of said data stream, wherein each of said data packets corresponds to one or more commands belonging to a response virtual channel;
   determining the presence of data packets stored in said data buffer that collectively contain a sequence of data forming a portion of said data stream;
   storing said one or more commands in response to said one or more commands being a start command of said portion of said data stream; and
   in response to said start command winning an arbitration, causing said sequence of data to be conveyed on said peripheral bus in response to determining the presence of said data packets stored in said data buffer.

7. The method as recited in claim 6 further comprising causing one or more bus cycles to be initiated and thereby conveying said sequence of data upon said peripheral bus.

8. The method as recited in claim 7, wherein each of said one or more bus cycles includes an address corresponding to each data packet contained in said sequence of data.

9. The method as recited in claim 8 further comprising providing information corresponding to a bus cycle associated with said request for a stream of data.

10. The method as recited in claim 9, wherein said request for a stream of data belongs to non-posted channel.

* * * * *